United States Patent
Ikushima et al.

(10) Patent No.: US 7,835,524 B2
(45) Date of Patent: Nov. 16, 2010

(54) ENCRYPTING OF COMMUNICATIONS USING A TRANSMITTING/RECEIVING APPARATUS VIA KEY INFORMATION BASED ON A MULTI-LEVEL CODE SIGNAL AND A PSEUDO-RANDOM NUMBER SEQUENCE FOR MODULATION WITH AN INFORMATION SIGNAL

(75) Inventors: Tsuyoshi Ikushima, Nara (JP); Satoshi Furusawa, Osaka (JP); Tomokazu Sada, Osaka (JP); Masaru Fuse, Osaka (JP)

(73) Assignee: Panasonic Corporation, Osaka (JP)

( * ) Notice: Subject to any disclaimer, the term of this patent is extended or adjusted under 35 U.S.C. 154(b) by 955 days.

(21) Appl. No.: 11/702,053

(22) Filed: Feb. 5, 2007

(65) Prior Publication Data

US 2007/0189521 A1     Aug. 16, 2007

(30) Foreign Application Priority Data

Feb. 8, 2006    (JP)    ............................ 2006-030942

(51) Int. Cl.
  *H04L 9/26* (2006.01)
  *H04L 27/04* (2006.01)
(52) U.S. Cl. .................. 380/268; 375/286; 375/367
(58) Field of Classification Search ........... 380/239, 380/32, 42–41, 259–260, 262–264, 36–37, 380/275, 268; 713/500–503, 600–601; 375/286, 375/367

See application file for complete search history.

(56) References Cited

U.S. PATENT DOCUMENTS 4,071,692 A * 1/1978 Weir et al. .................. 375/242
4,126,761 A * 11/1978 Graupe et al. .................. 380/28

(Continued)

FOREIGN PATENT DOCUMENTS

JP     9-205420     8/1997

(Continued)

OTHER PUBLICATIONS

"Cryptography and Network Security: Principle and Practice" translated by Keiichiro Ishibashi et al., Pearson Education, 2001.

(Continued)

*Primary Examiner*—Gilberto Barron, Jr.
*Assistant Examiner*—Venkat Perungavoor
(74) *Attorney, Agent, or Firm*—Wenderoth, Lind & Ponack, L.L.P.

(57) ABSTRACT

A highly concealable data communication apparatus based on an astronomical complexity and causing an eavesdropper to take a significantly increased time to analyze a cipher text, is provided. In a multi-level code generation section 111a, a random number sequence generation section 141 generates, based on predetermined key information 11, a plurality of modulation pseudo-random number sequences. The plurality of modulation pseudo-random number sequences is inputted to a multi-level conversion section 142 as a part of an input bit sequence which is converted into a multi-level code sequence 12. A multi-level processing section 111b combines the multi-level code sequence 12 and information data 10, and generates a multi-level signal 13 having a plurality of levels corresponding to a combination of the multi-level code sequence 12 and the information data 10.

19 Claims, 18 Drawing Sheets

U.S. PATENT DOCUMENTS

| | | | |
|---|---|---|---|
| 4,654,704 A * | 3/1987 | Lippel | 380/216 |
| 4,700,387 A * | 10/1987 | Hirata | 380/239 |
| 5,493,584 A * | 2/1996 | Emeott | 375/224 |
| 5,917,852 A * | 6/1999 | Butterfield et al. | 375/141 |
| 6,009,135 A * | 12/1999 | Ozluturk | 375/377 |
| 7,079,592 B2 * | 7/2006 | Chang et al. | 375/316 |

FOREIGN PATENT DOCUMENTS

| | | |
|---|---|---|
| JP | 2005-057313 | 3/2005 |

OTHER PUBLICATIONS

"Applied Cryptography" translated by Mayumi Adachi et al., Softbank publishing, 2003.

"Cryptography and Network Security: Principles and Practice" Second Edition, William Stallings, Prentice-Hall, Inc., New Jersey, 1999, pp. 131-159.

"Applied Cryptography" Second Edition, Bruce Schneier, John Wiley & Sons, Inc., 1996, pp. 369-395.

* cited by examiner

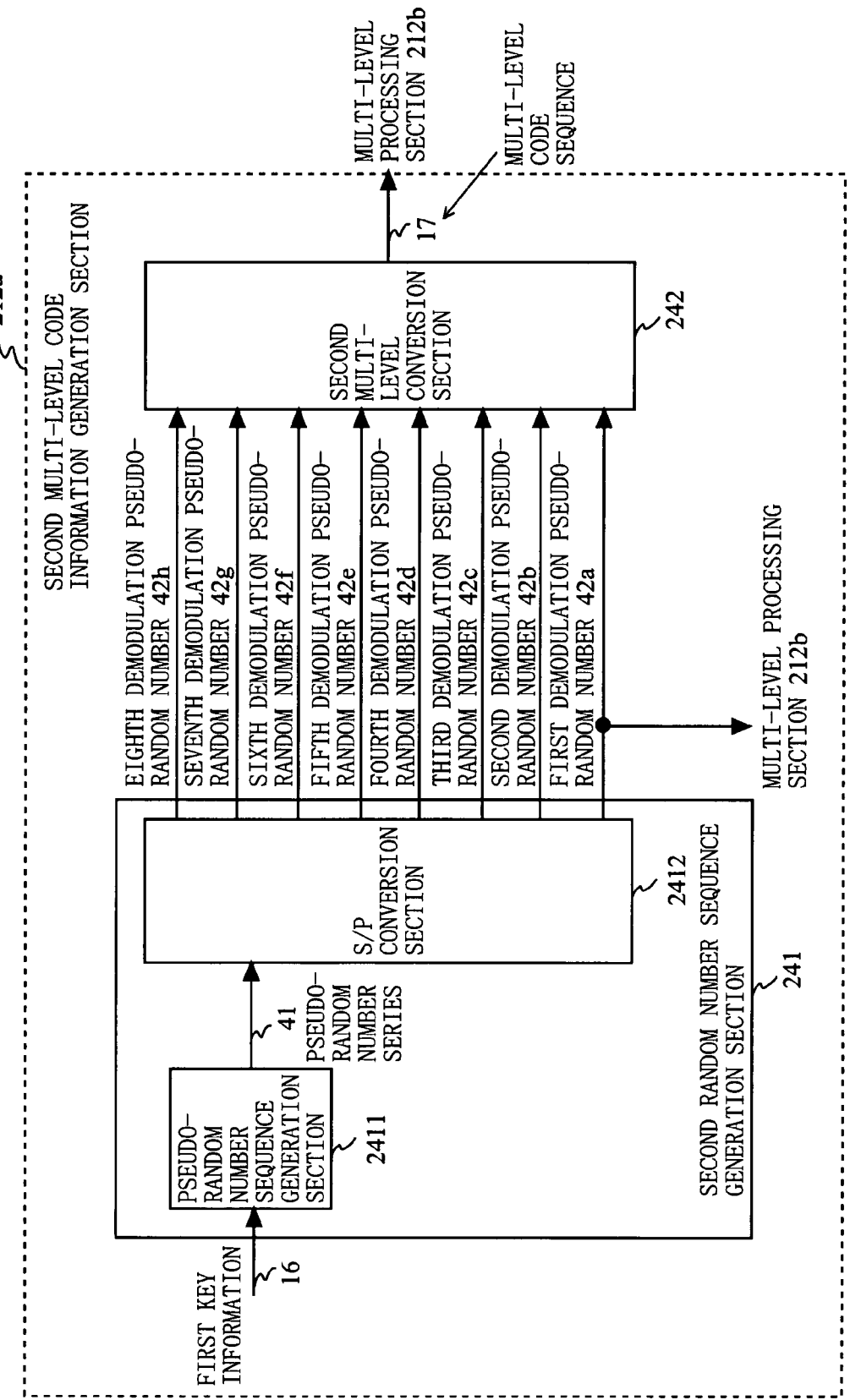
F I G. 7

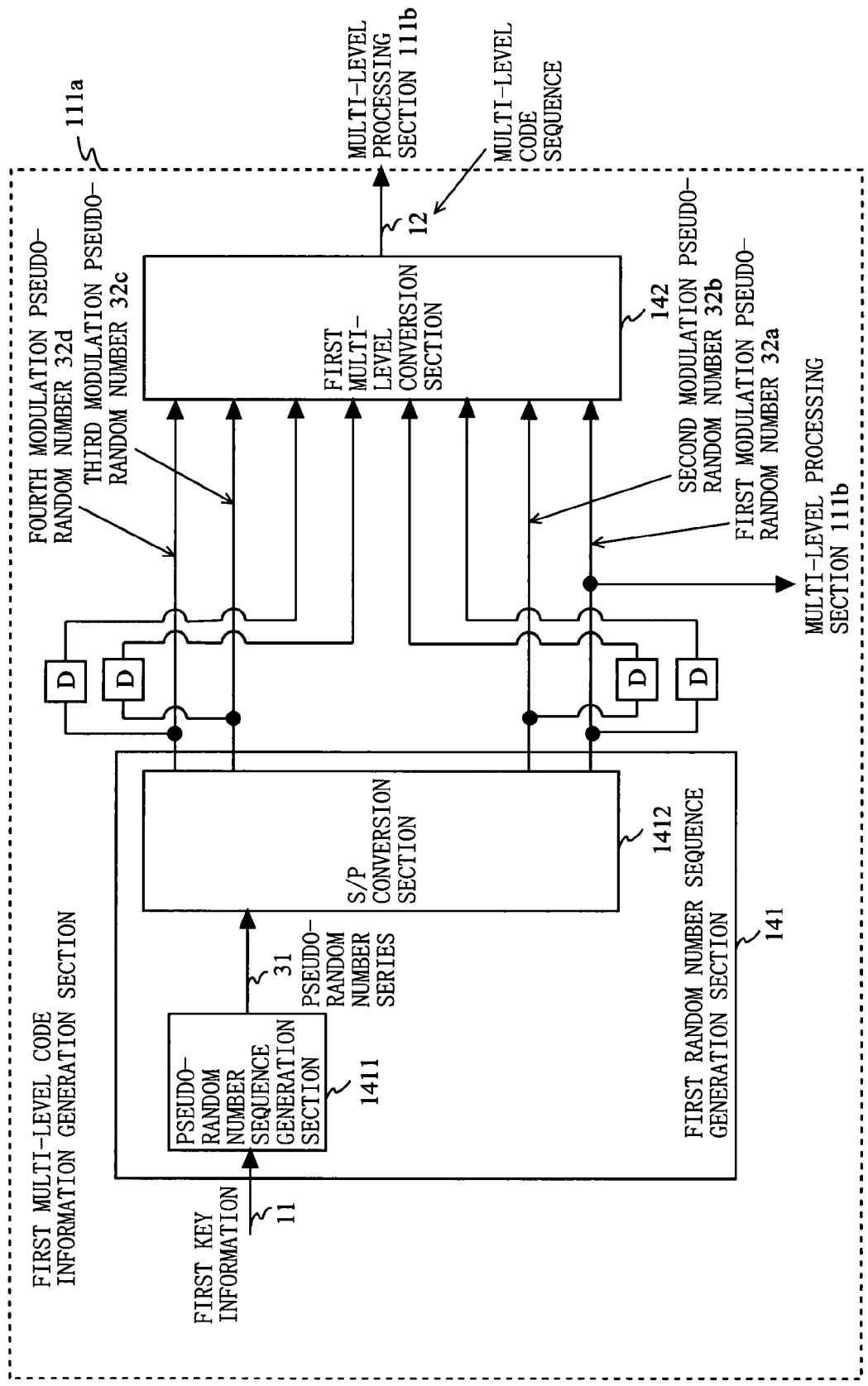

ENCRYPTING OF COMMUNICATIONS USING A TRANSMITTING/RECEIVING APPARATUS VIA KEY INFORMATION BASED ON A MULTI-LEVEL CODE SIGNAL AND A PSEUDO-RANDOM NUMBER SEQUENCE FOR MODULATION WITH AN INFORMATION SIGNAL

BACKGROUND OF THE INVENTION

1. Field of the Invention

The preset invention relates to an apparatus and a method for performing secret communication in order to avoid illegal eavesdropping and interception by a third party and, more particularly, relates to a data transmitting apparatus, a data receiving apparatus and a data transmitting method for performing data communication through selecting and setting a specific encoding/decoding (modulating/demodulating) method between a legitimate transmitter and a legitimate receiver.

2. Description of the Related Art

Conventionally, in order to perform secret communication between specific parties, there has been adopted a structure for realizing secret communication by sharing key information for encoding/decoding between transmitting and receiving ends and by performing, based on the key information, an operation/inverse operation on information data (plain text) to be transmitted, in a mathematical manner. FIG. 17 is a block diagram showing a structure of a conventional data communication apparatus based on the above-described structure.

In FIG. 17, the conventional data communication apparatus has a configuration in which a data transmitting apparatus 9001 and a data receiving apparatus 9002 are connected to each other via a transmission line 913. The data transmitting apparatus 9001 includes an encoding section 911 and a modulator section 912. The data receiving apparatus 9002 includes a demodulator section 914 and a decoding section 915.

In the data transmitting apparatus 9001, information data 90 and first key information 91 are inputted to the encoding section 911. The encoding section 911 encodes (modulates), based on the first key information 91, the information data 90. The modulator section 912 converts, in a predetermined demodulation method, the information data 90 encoded by the encoding section 911 into a modulated (modulating) signal 94 which is then transmitted to the transmission line 913.

In the data receiving apparatus 9002, the demodulator section 914 demodulates, in a predetermined demodulation method, the modulated (modulating) signal 94 transmitted via the transmission line 913. To the decoding section 915, second key information 96 which has the same content as the first key information 91 is inputted. The decoding section 915 demodulates (decrypts), based on the second key information 96, the modulated (modulating) signal 94 and then outputs information data 98.

Here, eavesdropping by a third party will be described by using an eavesdropper receiving apparatus 9003. In FIG. 17, eavesdropper receiving apparatus 9003 includes an eavesdropper demodulator section 916 and an eavesdropper decoding section 917.

The eavesdropper demodulator section 916 demodulates, in a predetermined demodulation method, the modulated (modulating) signal 94 transmitted via the transmission line 913. The eavesdropper decoding section 917 attempts, based on third key information 99, decoding of a signal demodulated by the eavesdropper demodulator section 916. Here, since the eavesdropper decoding section 917 attempts, based on the third key information 99 which is different in content from the first key information 91, decoding of the signal demodulated by the eavesdropper demodulator section 916, the information data 98 cannot be reproduced accurately.

A mathematical encryption (or also referred to as a computational encryption or a software encryption) technique based on such mathematical operation may be applicable to an access system described in Japanese Laid-Open Patent Publication No. 9-205420 (hereinafter referred to as Patent Document 1), for example. That is, in a PON (Passive Optical Network) system in which an optical signal transmitted from an optical transmitter is divided by an optical coupler and distributed to optical receivers at a plurality of optical subscribers' houses, such optical signals that are not desired and aimed at another subscribers are inputted to each of the optical receivers. Therefore, the PON system encrypts information data for each of the subscribers by using key information which is different by the subscribers, thereby preventing a leakage/eavesdropping of mutual information data and realizing safe data communication.

Further, the mathematical encryption technique is described in "Cryptography and Network Security: Principles and Practice" translated by Keiichiro Ishibashi et al., Pearson Education, 2001 (hereinafter referred to as Non-patent Document 1) and "Applied Cryptography" translated by Mayumi Adachi et al., Softbank publishing, 2003 (hereinafter referred to as Non-patent Document 2).

Among the mathematical encryption, a method called a stream encryption has a simple structure in which a cipher text is generated by performing an XOR operation between a pseudo-random number sequence outputted by a pseudo-random number generator and information data (a plain text) to be encrypted, and thus is advantageous for an increase in speed. On the other hand, the method is disadvantageous in that security in the stream encryption depends only on the pseudo-random number generator. That is, if the eavesdropper can obtain a combination of the plain text and the cipher text, the pseudo-random number series can be identified accurately (this is generally called a known-plain-text attack). Further, since an initial value of the pseudo-random number generator, that is, the key information and the pseudo-random number series correspond to each other uniquely, the key information can be figured out certainly if any decryption algorithm is applied. Further, a processing speed of a computer has been improved remarkably in recent years, and thus there has been a problem in that there is an increasing danger of decryption of the cipher text within a practical time period.

BRIEF SUMMARY OF THE INVENTION

Therefore, an object of the present invention is to provide a highly concealable data communication apparatus which causes the eavesdropper to take a significantly increased effort and time to analyze the cipher text, compared to a conventional stream encryption, by introducing an uncertain element into a relation among key information, a pseudo-random number sequence and a cipher text.

The present invention is directed to a data transmitting apparatus for encrypting information data by using predetermined key information and performing secret communication with a receiving apparatus. To attain the object mentioned above, the data receiving apparatus of the present invention includes: a multi-level code generation section for generating, based on the predetermined key information, a multi-level code sequence in which a signal level changes so as to approximately represent random numbers; a multi-level processing section for combining the multi-level code sequence and the information data and generating a multi-level signal having a plurality of levels corresponding to a combination of the multi-level code sequence and the information data; and a modulator section for treating the multi-level signal with predetermined modulation processing and outputting a modulated signal. Further, the multi-level code generation section includes: a random number sequence generation section for generating, based on the predetermined key information, a plurality of modulation pseudo-random number sequences; and a multi-level conversion section to which a plurality of bit sequences including at least a part of the plurality of modulation pseudo-random number sequences is inputted as an input bit sequence and which converts the input bit sequence into the multi-level code sequence. The input bit sequence to the multi-level conversion section is greater in a number of digits than each of the plurality of modulation pseudo-random number sequences generated by the random number sequence generation section.

Preferably, the multi-level processing section allocates different values of the information data to adjoining multi-levels of the multi-level signal.

At least one of the plurality of modulation pseudo-random number sequences is inputted to the multi-level conversion section as a lowest-order bit of the input bit sequence.

Preferably, the multi-level code generation section further includes a physical random number generation section for generating one or more physical random number sequences. In this case, the one or more physical random number sequences are inputted, to the multi-level conversion section, as remaining bit sequences of the input bit sequence after excluding the at least a part of the plurality of the modulation pseudo-random number sequences.

Further, fixed values maybe inputted, to the multi-level conversion section, as remaining bit sequences of the input bit sequence after excluding the at least a part of the plurality of the modulation pseudo-random number sequences.

Preferably, the multi-level code generation section further includes a physical random number generation section for generating one or more physical random number sequences. In this case, the one or more physical random number sequences are inputted to the multi-level conversion section as a part of the plurality of the bit sequences of the input bit sequence after excluding the at least a part of the plurality of the modulation pseudo-random number sequences, and fixed values are inputted, as remaining bit sequences thereof.

Further, a signal generated based on a predetermined rule may be inputted, to the multi-level conversion section, as remaining bit sequences of the input bit sequence excluding the at least a part of the plurality of the modulation pseudo-random number sequences. The signal generated based on the predetermined rule may be generated by delaying a part or a whole of the plurality of modulation pseudo-random number sequences by a predetermined time period.

A condition needs to be satisfied where a ratio of an information amplitude, which corresponds to an amplitude of the information data, to a fluctuation width of the multi-level signal is greater than a signal-to-noise ratio acceptable to a legitimate receiving party.

Preferably, the random number sequence generation section includes: a pseudo-random number generation section for generating, based on the predetermined key information, a pseudo-random number series which is in a binary format; and a serial/parallel conversion section for performing serial/parallel conversion of the pseudo-random number series generated by the pseudo-random number generation section, and outputting the plurality of modulation pseudo-random number sequences.

Further, the random number sequence generation section may includes: a pseudo-random number generation section for generating, based on the predetermined key information, a pseudo-random number series which is in a binary format; a plurality of serial/parallel conversion sections for performing serial/parallel conversion of the pseudo-random number series generated by the pseudo-random number generation section and outputting the plurality of modulation pseudo-random number sequences; a first switch for switching, based on a rate selection signal, an output destination of the pseudo-random number series generated by the pseudo-random number generation section, between the plurality of serial/parallel conversion sections; and a second switch for selecting, based on the rate selection signal, and outputting the plurality of modulation pseudo-random number sequences outputted from the plurality of serial/parallel conversion sections. The plurality of serial/parallel conversion sections output respectively different numbers of the plurality of modulation pseudo-random number sequences.

Further, the present invention is directed to a data receiving apparatus for receiving information data encrypted by using predetermined key information and performing secret communication with a transmitting apparatus. To attain the object mentioned above, the data receiving apparatus includes: a multi-level code generation section for generating, based on the predetermined key information, a multi-level code sequence in which a signal level changes so as to approximately represent random numbers; a demodulator section for demodulating, in a predetermined demodulation method, a modulated signal received from the transmitting apparatus so as to be outputted as a multi-level signal having a plurality of levels corresponding to a combination of the information data and the multi-level code sequence; and an decision section for deciding, based on the multi-level code sequence, the information data from the multi-level signal. The multi-level code generation section includes: a random number sequence generation section for generating, based on the predetermined key information, a plurality of demodulation pseudo-random number sequences; and a multi-level conversion section to which a plurality of bit sequences including at least a part of the plurality of demodulation pseudo-random number sequences are inputted as an input bit sequence, and which converts the input bit sequence into the multi-level code sequence. The input bit sequence to the multi-level conversion section is greater in a number of digits than each of the plurality of demodulation pseudo-random number sequences generated by the random number sequence generation section.

Fixed values are inputted, to the multi-level conversion section, as remaining bit sequences of the input bit sequence excluding the at least a part of the plurality of demodulation pseudo-random number sequences.

A signal generated based on a predetermined rule may be inputted, to the multi-level conversion section, as remaining bit sequences of the input bit sequence excluding the at least a part of the plurality of demodulation pseudo-random number sequences. The signal generated based on the predetermined rule may be generated by delaying a part or a whole of the plurality of demodulation pseudo-random number sequences by a predetermined time period.

A condition needs to be satisfied where a ratio of an information amplitude corresponding to an amplitude of the information data to a fluctuation width of the multi-level signal corresponding to remaining bit sequences of the input bit sequence to the multi-level conversion section, after excluding the plurality of demodulation pseudo-random number sequences, is greater than a signal-to-noise ratio acceptable to a legitimate receiving party.

Preferably, the random number sequence generation section includes: a pseudo-random number generation section for generating, based on the predetermined key information, a pseudo-random number series which is in a binary format; and a serial/parallel conversion section for performing serial/parallel conversion of the pseudo-random number series generated by the pseudo-random number generation section, and outputting the plurality of demodulation pseudo-random number sequences.

Further, the random number sequence generation section may include: a pseudo-random number generation section for generating, based on the predetermined key information, a pseudo-random number series which is in a binary format; a plurality of serial/parallel conversion sections for performing serial/parallel conversion of the pseudo-random number series generated by the pseudo-random number generation section and outputting the plurality of demodulation pseudo-random number sequences; a first switch for switching, based on a rate selection signal, an output destination of the pseudo-random number series generated by the pseudo-random number generation section, between the plurality of the serial/parallel conversion sections; and a second switch for selecting, based on the rate selection signal, and outputting the plurality of demodulation pseudo-random number sequences outputted from the plurality of serial/parallel conversion sections. The plurality of serial/parallel conversion sections outputs respectively different numbers of the plurality of demodulation pseudo-random number sequences.

Further, the data transmission apparatus mentioned above and processing procedures performed by the modulation section maybe regarded as a data transmission method for causing a series of processing procedures to be executed. That is, the data transmission method includes: a multi-level code generation step of generating, based on the predetermined key information, a multi-level code sequence in which a signal level changes so as to approximately represent random numbers; a step of combining the multi-level code sequence and the information data and generating a multi-level signal having a plurality of levels corresponding to a combination of the multi-level code sequence and the information data; and a modulation step of treating the multi-level signal with predetermined modulation processing and outputting a modulated signal. The multi-level code generation step includes: a random number sequence generation step of generating, based on the predetermined key information, a plurality of modulation pseudo-random number sequences; and a multi-level conversion step in which a plurality of bit sequences including at least apart of the plurality of modulation pseudo-random number sequences is inputted as an input bit sequence and the input bit sequences are converted into the multi-level code sequence. The input bit sequence is greater in a number of digits than each of the plurality of modulation pseudo-random number sequences.

Further, respective processing procedures performed by the multi-level code generation section, the demodulation section, and the decision section which are included in the data receiving apparatus mentioned above maybe regarded as a data receiving method for causing a series of processing procedures to be executed. That is, the data receiving method includes: a multi-level code generation step of generating, based on the predetermined key information, a multi-level code sequence in which a signal level changes so as to approximately represent random numbers; a demodulation step of demodulating, in a predetermined demodulation method, a modulated signal received from the transmitting apparatus so as to be outputted as a multi-level signal having a plurality of levels corresponding to a combination of the information data and the multi-level code sequence; and an decision step of deciding, based on the multi-level code sequence, the information data from the multi-level signal. The multi-level code generation step includes: a random number sequence generation step of generating, based on the predetermined key information, a plurality of demodulation pseudo-random number sequences; and a multi-level conversion step in which a plurality of bit sequences including at least a part of the plurality of demodulation pseudo-random number sequences are inputted as an input bit sequence, and the input bit sequence is converted into the multi-level code sequence. The input bit sequence is greater in a number of digits than each of the plurality of demodulation pseudo-random number sequences.

The data communication apparatus of the present invention encodes/modulates, based on key information, information data into a multi-level signal which is then to be transmitted, decodes/demodulates, based on the key information, a received multi-level signal and optimizes a signal-to-noise power ratio of the multi-level signal, thereby causing a cipher text obtained by an eavesdropper to be erroneous. As a result, the eavesdropper needs to perform decoding considering that a correct cipher text is highly likely to be different from what the eavesdropper has obtained, and thus the number of attempts required for the decoding, that is the amount of computing, will be increased compared to a case of no error. Accordingly, security against eavesdropping can be improved. Further, the intervals between the levels of the multi-level signal are set appropriately, whereby an increase in a rate of the cipher text pseudo-random number generator used within the apparatus can be kept at the lowest level.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing an example of a detailed configuration of a second multi-level code generation section 212$a$ according to the second embodiment of the present invention;

FIG. 14B is a block diagram showing an example of another configuration of the first multi-level code generation section 111a according to the fourth embodiment of the present invention;

DETAILED DESCRIPTION OF THE INVENTION

Hereinafter, embodiment of the present invention will be described, with reference to drawings.

First Embodiment

Figure 1:
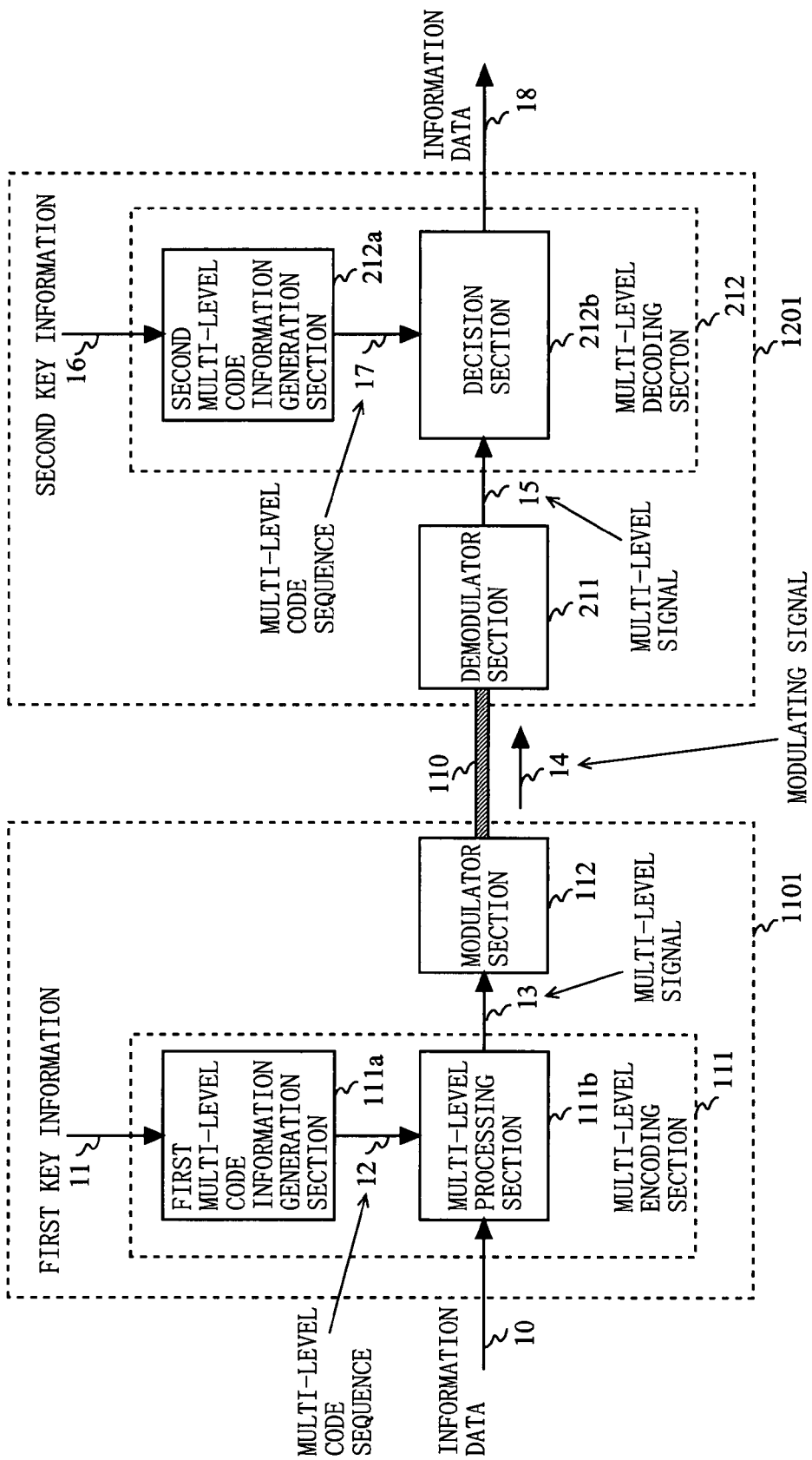
FIG. 1 is a block diagram showing an example of a configuration of a data communication apparatus according to the present invention.

FIG. 1 is a block diagram showing an example of a configuration of a data communication apparatus according to the present invention. In FIG. 1, the data communication apparatus according to the first embodiment has a configuration in which a data transmitting apparatus 1101 and a data receiving apparatus 1201 are connected to each other via a transmission line 110. The data transmitting apparatus 1101 includes a multi-level encoding section 111 and a modulator section 112. The multi-level encoding section 111 includes a first multi-level code generation section 111a and a multi-level processing section 111b. The data receiving apparatus 1201 includes a demodulator section 211 and a multi-level decoding section 212. The multi-level decoding section 212 includes a second multi-level code generation section 212a and a decision section 212b. A metal line such as a LAN cable or a coaxial line, or an optical waveguide such as an optical-fiber cable can be used as the transmission line 110. Further the transmission line 110 is not limited to a wired cable such as the LAN cable, but can be free space which enables a wireless signal to be transmitted.

Figure 2:
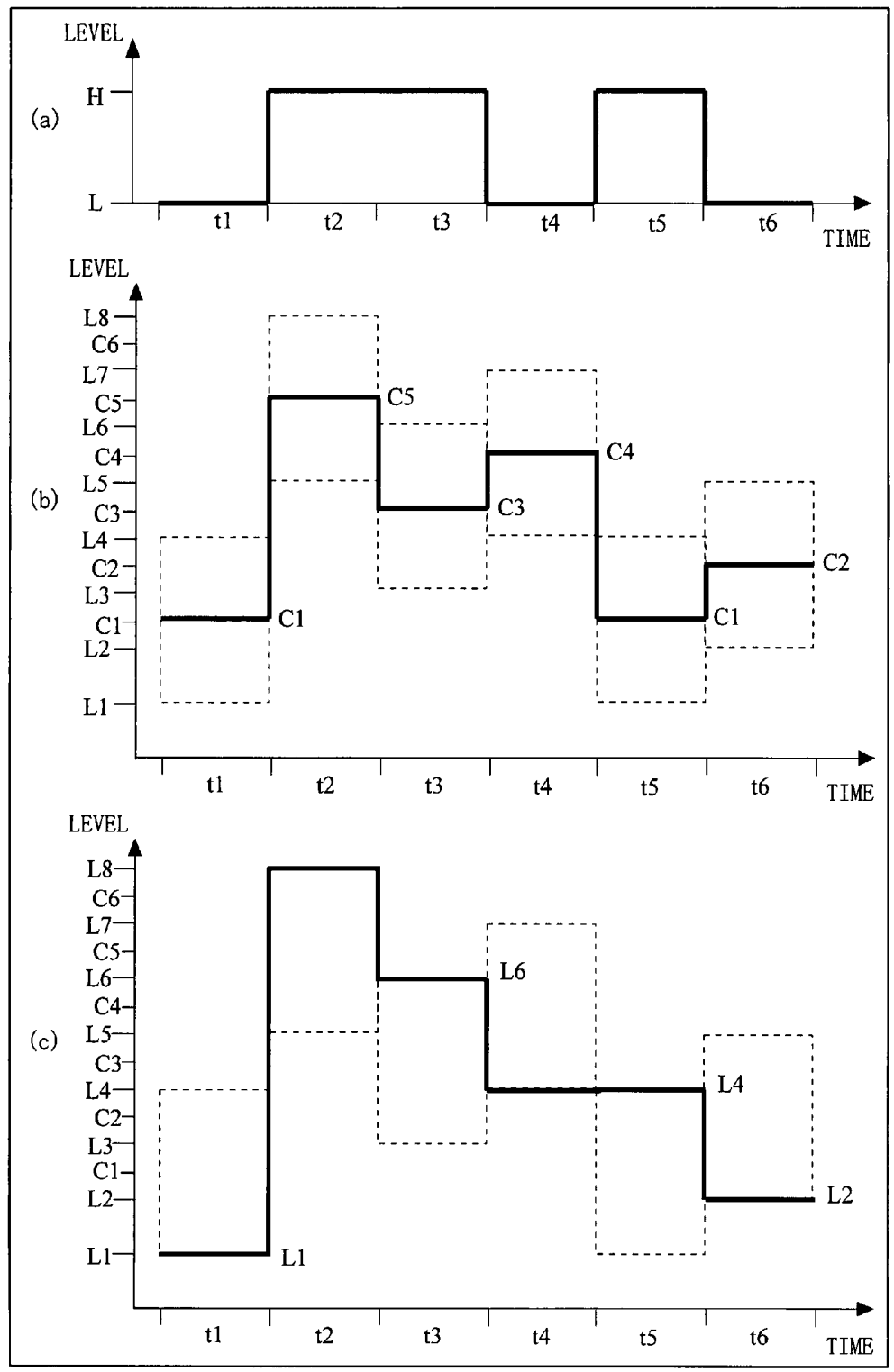
FIG. 2 is a diagram illustrating a waveform of a transmission signal of the data communication apparatus according to the first embodiment of the present invention.
Figure 3:
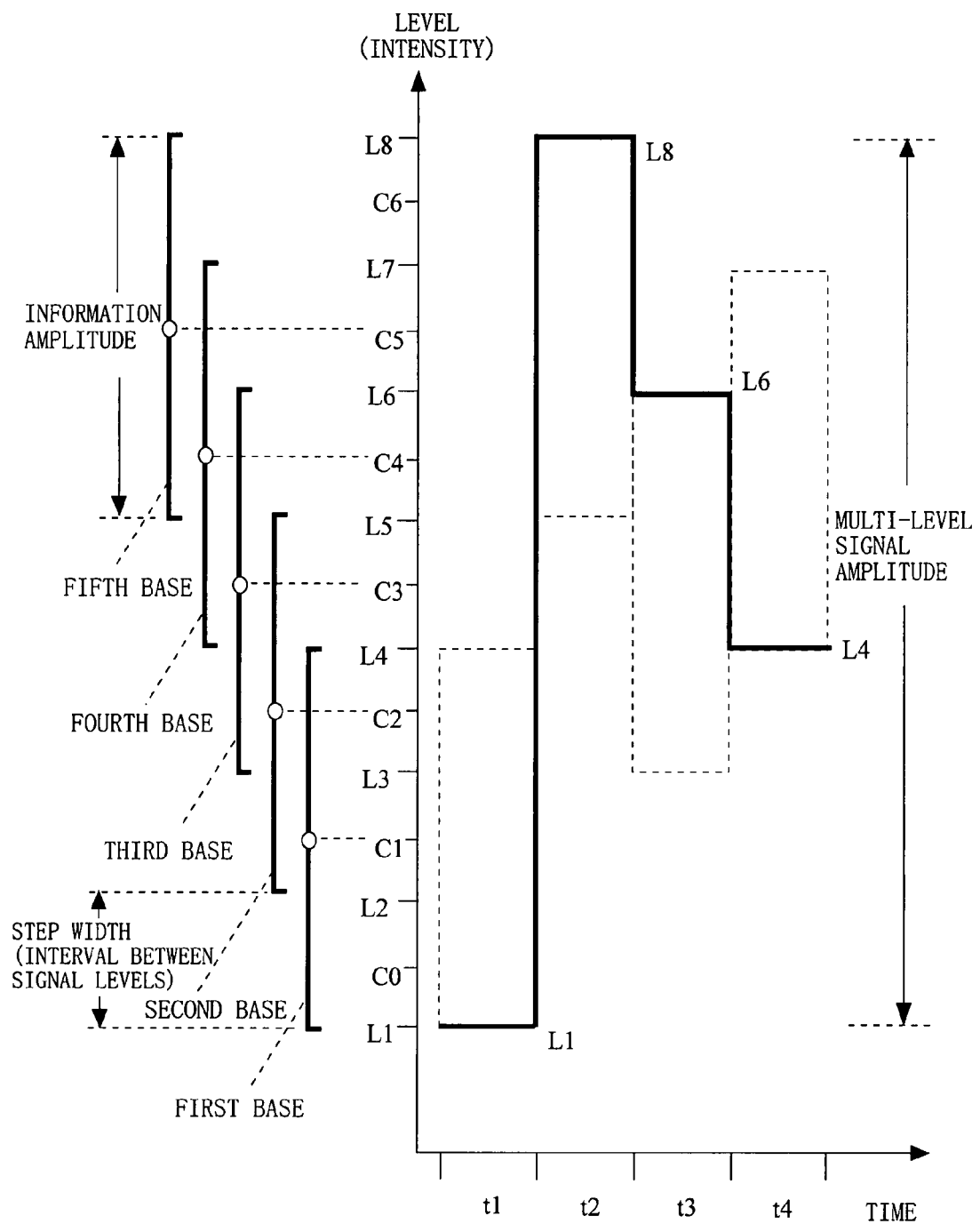
FIG. 3. is a diagram illustrating names of the waveform of the transmission signal of the data communication apparatus according to the first embodiment of the present invention.
Figure 4:
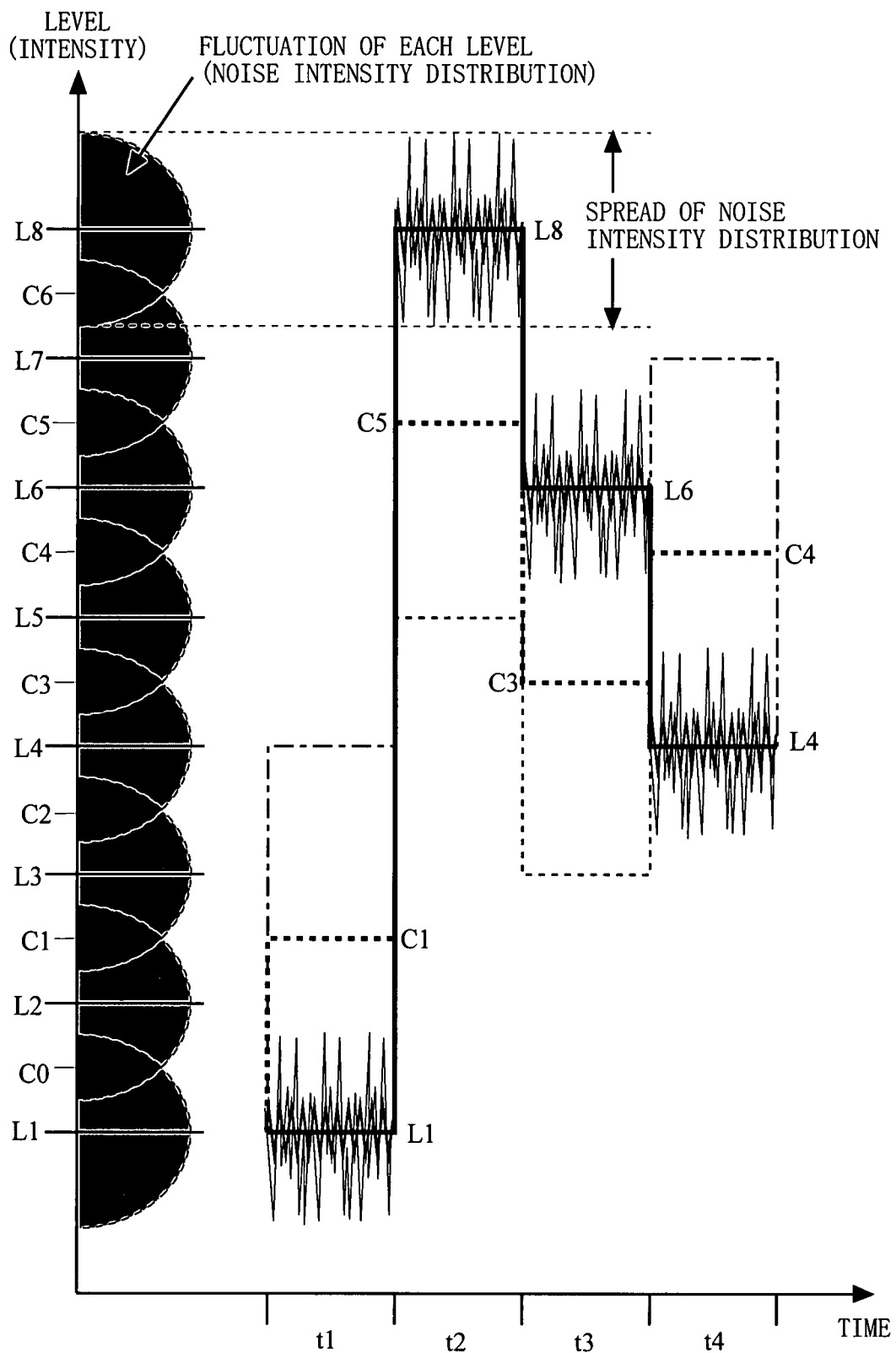
FIG. 4 is a diagram illustrating quality of the transmission signal of the data communication apparatus according to the first embodiment of the present invention.

FIG. 2 is a diagram illustrating a waveform of a transmission signal of the data communication apparatus according to the first embodiment of the present invention. FIG. 3 is a diagram illustrating names of the waveform of the transmission signal of the data communication apparatus according to the first embodiment of the present invention. FIG. 4 is a diagram illustrating quality of the transmission signal of the data communication apparatus according to the first embodiment of the present invention. Hereinafter, an action of the data communication apparatus according to the first embodiment of the present invention will be described, with reference to FIGS. 1 to 4.

The first multi-level code generation section 111a generates, based on predetermined first key information 11, a multi-level code sequence 12 ((b) of FIG. 2) in which a signal level changes so as to approximately represent random numbers. The multi-level code sequence 12 ((b) of FIG. 2) and information data 10 ((a) of FIG. 2) are inputted to the multi-level processing section 111b. The multi-level processing section 111b combines the multi-level code sequence 12 and the information data 10 in accordance with a predetermined procedure, and generates a multi-level signal 13 ((c) of FIG. 2) having a plurality of levels corresponding to a combination of the multi-level code sequence 12 and the information data 10. For example, in the case where a level of the multi-level code sequence 12 changes to c1/c5/c3/c4 with respect to time slots t1/t2/t3/t4, the multi-level processing section 111b regards the multi-level code sequence 12 as a bias level, adds the information data 10 to the multi-level code sequence 12, and then generates the multi-level signal 13 in which a signal level changes to L1/L8/L6/L4. The modulator section 112 modulates the multi-level signal 13 in a predetermined modulation method, and outputs the modulated multi-level signal 13 as a modulated (modulating) signal 14 to the transmission line 110.

Here, as shown in FIG. 3, an amplitude of the information data 10 is referred to as an "information amplitude", a total amplitude of the multi-level signal 13 is referred to as a "multi-level signal amplitude", pairs of levels (L1, L4)/(L2, L5)/(L3, L6)/(L4, L7)/(L5, L8) which the multi-level signal 13 may obtain corresponding to the levels c1/c2/c3/c4/c5 of the multi-level code sequence 12 are respectively referred to as first to fifth "bases", and a minimum interval between signal levels of the multi-level signal 13 is referred to as a "step width".

The demodulator section 211 demodulates the modulated signal 14 transmitted via the transmission line 110, and reproduces a multi-level signal 15. The second multi-level code generation section 212a previously shares second key information 16 which has the same content as the first key information 11, and based on the second key information 16, generates a multi-level code sequence 17. The decision section 212b receives the multi-level signal 15 and reproduces information data 18 by deciding (binary determination) a value of the information data 18 using the multi-level code sequence 17 as a threshold. Here, the modulated (modulating) signal 14 which is modulated in a predetermined modulation method and is transmitted/received between the modulator section 112 and the demodulator section 211 via the transmission line 110, is a signal obtained by modulating an electromagnetic wave (electromagnetic field) or a light wave using the multi-level signal 13.

Note that, the multi-level processing section 111b may generate the multi-level signal 13 by using any method, in addition to a method of generating the multi-level signal 13 by adding the information data 10 and the multi-level code sequence 12 as above described. For example, the multi-level processing section 111*b* may generate the multi-level signal 13 by modulating, based on the information data 10, an amplitude of the levels of the multi-level code sequence 12. Alternatively, the multi-level processing section 111*b* may generate the multi-level signal 13 by reading out consecutively, from a memory having levels of the multi-level signal 13 previously stored therein, the levels of the multi-level signal 13, which are corresponding to the combination of the information data 10 and the multi-level code sequence 12.

Further, in FIG. 2 and FIG. 3, the levels of the multi-level signal 13 are represented as 8 levels, but the levels of the multi-level signal 13 are not limited to the representation. Further, the information amplitude is represented as three times or integer times of the step width of the multi-level signal 13, but the information amplitude is not limited to the representation. The information amplitude may be any integer times of the step width of the multi-level signal 13, or is not necessarily integer times thereof. Further, in FIG. 2 and FIG. 3, each of the levels of the multi-level code sequence 12 is located so as to be at an approximate center between each of the levels of the multi-level signal 13, but each of the levels of the multi-level code sequence 12 is not limited to such a location. For example, each of the levels of the multi-level code sequence 12 is not necessarily at the approximate center between each of the levels of the multi-level signal 13, or may coincide with each of the levels of the multi-level signal 13. Further, the above description is based on an assumption that the multi-level code sequence 12 and the information data 10 are identical in a change rate to each other and also in a synchronous relation, but the change rate of either of the multi-level code sequence 12 or the information data 10 maybe faster (or slower) than the change rate of another, or the multi-level code sequence 12 and the information data 10 are in an asynchronous relation.

Next, an action of eavesdropping by a third party will be described. It is assumed that the third party, who is an eavesdropper, decodes the modulated (modulating) signal 14 by using a configuration corresponding to the data receiving apparatus 1201 held by a legitimate receiving party or a further sophisticated data receiving apparatus (hereinafter referred to as an eavesdropper data receiving apparatus). The eavesdropper data receiving apparatus reproduces the multi-level signal 15 by demodulating the modulated (modulating) signal 14. However, the eavesdropper data receiving apparatus does not share the key information with the data transmitting apparatus 1101, and thus, unlike the data receiving apparatus 1201, the eavesdropper data receiving apparatus cannot generate, based on the key information, the multi-level code sequence 17. Therefore, the eavesdropper data receiving apparatus cannot perform binary determination of the multi-level signal 15 by using the multi-level code sequence 17 as a reference.

As an action of the eavesdropping which maybe possible under these circumstances, there is a method of identifying all the levels of the multi-level signal 15 (generally referred to as "all-possible attacks"). That is, the eavesdropper data receiving apparatus performs a determination of the multi-level signal 15 by preparing thresholds corresponding to all possible intervals between the signal levels which the multi-level signal 15 may obtain, and attempts an extraction of correct key information or information data by analyzing a result of the determination. For example, the eavesdropper data receiving apparatus sets all the levels c0/c1/c2/c3/c4/c5/c6 of the multi-level code sequence 12 shown in FIG. 2 as the thresholds, performs the multi-level determination of the multi-level signal 15, and then attempts the extraction of the correct key information or the information data.

However, in an actual transmission system, a noise occurs due to various factors, and the noise is overlapped on the modulated (modulating) signal 14, whereby the levels of the multi-level signal 15 fluctuates temporally/instantaneously as shown in FIG. 4. In this case, an SN ratio (a signal-to-noise intensity ratio) of a signal to be determined (the multi-level signal 15) by the legitimate receiving party (the data receiving apparatus 1201) is determined based on a ratio of the information amplitude to a noise level of the multi-level signal 15. On the other hand, the SN ratio of the signal to be determined (the multi-level signal 15) by the eavesdropper data receiving apparatus is determined based on a ratio of the step width to the noise level of the multi-level signal 15.

Therefore, in the case where a condition of the noise level contained in the signal to be determined is fixed, the SN ratio of the signal to be determined by the eavesdropper data receiving apparatus is relatively smaller than that by the data receiving apparatus 1201, and thus a transmission feature (an error rate) of the eavesdropper data receiving apparatus deteriorates. The data communication apparatus of the present invention utilizes this feature so as to induce an identification error in the all-possible attacks by the third party using all the thresholds, thereby causing the eavesdropping to be difficult. Particularly, in the case where the step width of the multi-level signal 15 is set at an order equal to or smaller than a noise amplitude (spread of a noise intensity distribution), the data communication apparatus substantially disables the multi-level determination by the third party, thereby realizing an ideal eavesdropping prevention.

As the noise to be overlapped on the signal to be determined (the multi-level signal 15 or the modulated (modulating) signal 14), a thermal noise (Gaussian noise) included in a space field or an electronic device, etc. maybe used, in the case where an electromagnetic wave such as a wireless signal is used as the modulated (modulating) signal 14, and a photon number distribution (quantum noise) may be used in addition to the thermal noise, in the case where the light wave is used. Particularly, signal processing such as recording and replication is not applicable to a signal using the quantum noise, and thus the step width of the multi-level signal 15 is set by using the quantum noise level as a reference, whereby the eavesdropping by the third party is disabled and an absolute security of the data communication is secured.

As above described, according to the data communication apparatus based on the first embodiment of the present invention, when the information data to be transmitted is encoded as the multi-level signal, the interval between the signal levels of the multi-level signal 13 is set with respect to the noise level so as to disable eavesdropping by the third party. Accordingly, quality of the receiving signal at the time of the eavesdropping by the third party is crucially deteriorated, and it is possible to provide a further safe data communication apparatus which causes decryption/decoding of the multi-level signal by the third party to be difficult.

Figure 5:
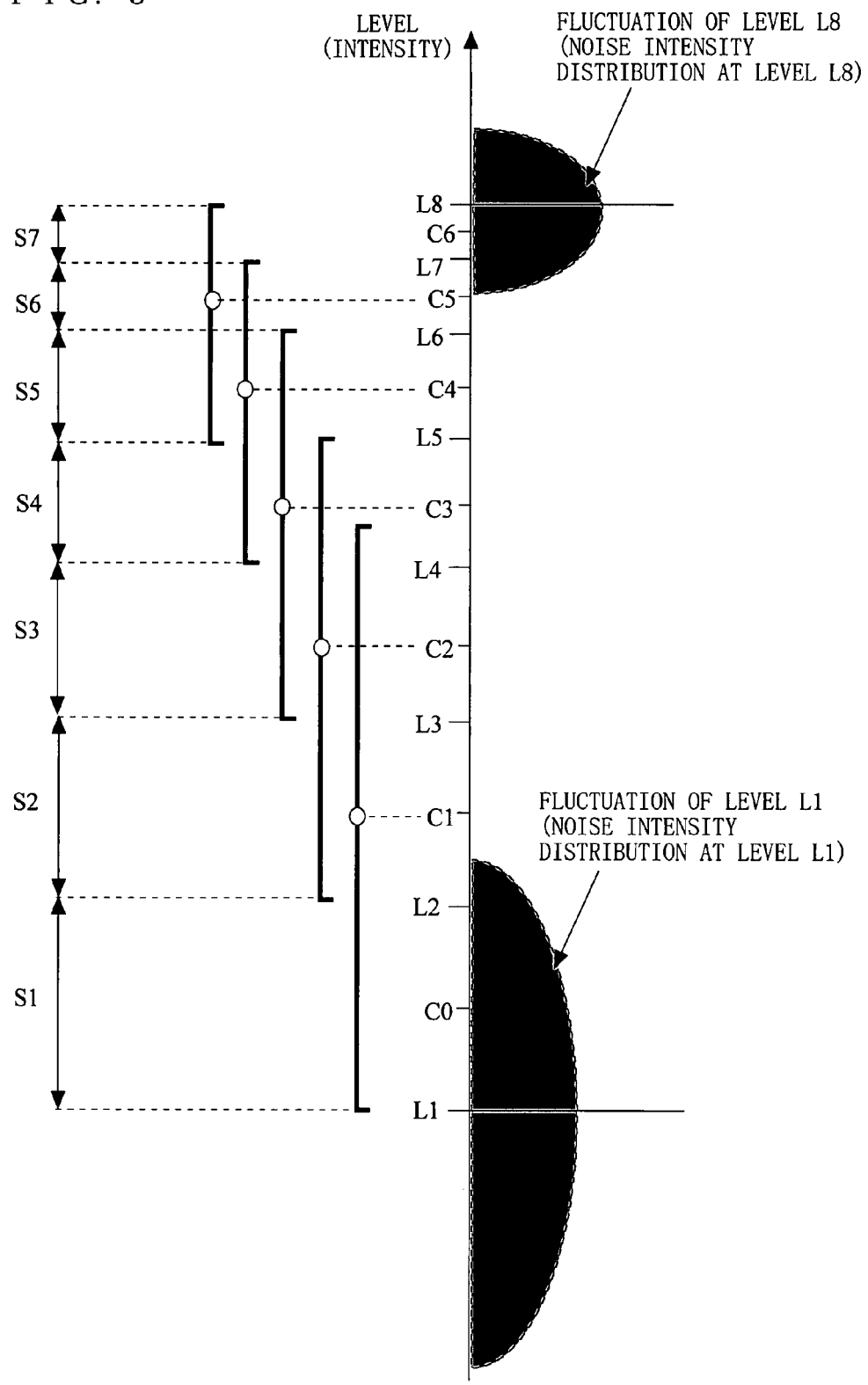
FIG. 5 is a diagram illustrating the quality of another transmission signal of the data communication apparatus according to the first embodiment of the present invention.

Note that the multi-level encoding section 111 may fluctuate the step width (S1 to S7) of the multi-level signal 13, as shown in FIG. 5, depending on a fluctuation level of each of the levels, that is, the noise intensity distribution overlapped on each of the levels. Specifically, the interval between the signal levels of the multi-level signal 13 is distributed such that respective SN ratios determined based on respective adjoining two signal levels of the signal to be determined which are inputted to the decision section 212*b* become approximately uniform. Further, the step width of each of the levels of the multi-level signal 13 is set in a uniform manner, in the case where the noise level to be overlapped on each of the levels is constant.

Generally, in the case where a light intensity modulated signal whose light source is a diode laser (LD) is assumed as the modulated signal 14 outputted from the modulator section 112, a fluctuation width (the noise level) of the modulated (modulating) signal 14 will vary depending on the levels of the multi-level signal 13 inputted to the diode laser. This results from the fact that the diode laser emits light based on the principle of stimulated emission which uses a spontaneous emission light as a "master light", and the noise level contained in the modulated signal outputted from the diode laser is defined based on a relative ratio of a stimulated emission light level to a spontaneous emission light level. That is, the higher an excitation rate of the diode laser (the excitation rate of the diode laser corresponds to a bias current to be injected) is, the larger a ratio of the stimulated emission light level becomes, and consequently the noise level becomes small. On the other hand, the lower the excitation rate of the diode laser is, the larger a ratio of the natural emission light level becomes, and consequently the noise level becomes large. Accordingly, as shown in FIG. 5, the multi-level encoding section 111 sets the step width to be large in a range where the level of the multi-level signal 13 is small, and sets the step width to be small in a range where the level of the multi-level signal is large, in a non-linear manner, whereby it is possible to set, in an approximately uniform manner, the respective SN ratios of the intervals between the respective adjoining signal levels of the signal to be determined.

Further, in the case where a light modulated signal is used as the modulated (modulating) signal 14, a SN ratio of a receiving signal will be determined mainly based on a shot noise as long as a noise caused by the spontaneous emission light or the thermal noise to be used for an optical receiver is sufficiently small. Under such condition, the larger the level of the multi-level signal is, the larger the noise level included in the multi-level signal becomes. Therefore, contrary to the case of FIG. 5, the multi-level encoding section 111 sets the step width to be small in the range where the level of the multi-level signal is small, and sets the step widths to be large in the range where the level of the multi-level signal is large, whereby it is possible to set, in an approximately uniform-manner, the respective SN ratios of the intervals between the respective adjoining signal levels of the signal to be determined. Accordingly, the quality of the receiving signal at the time of the eavesdropping by the third party is crucially deteriorated in a uniform manner, and it is possible to cause decryption/decoding of the multi-level signal by the third party to be difficult.

Second Embodiment

Figure 6:
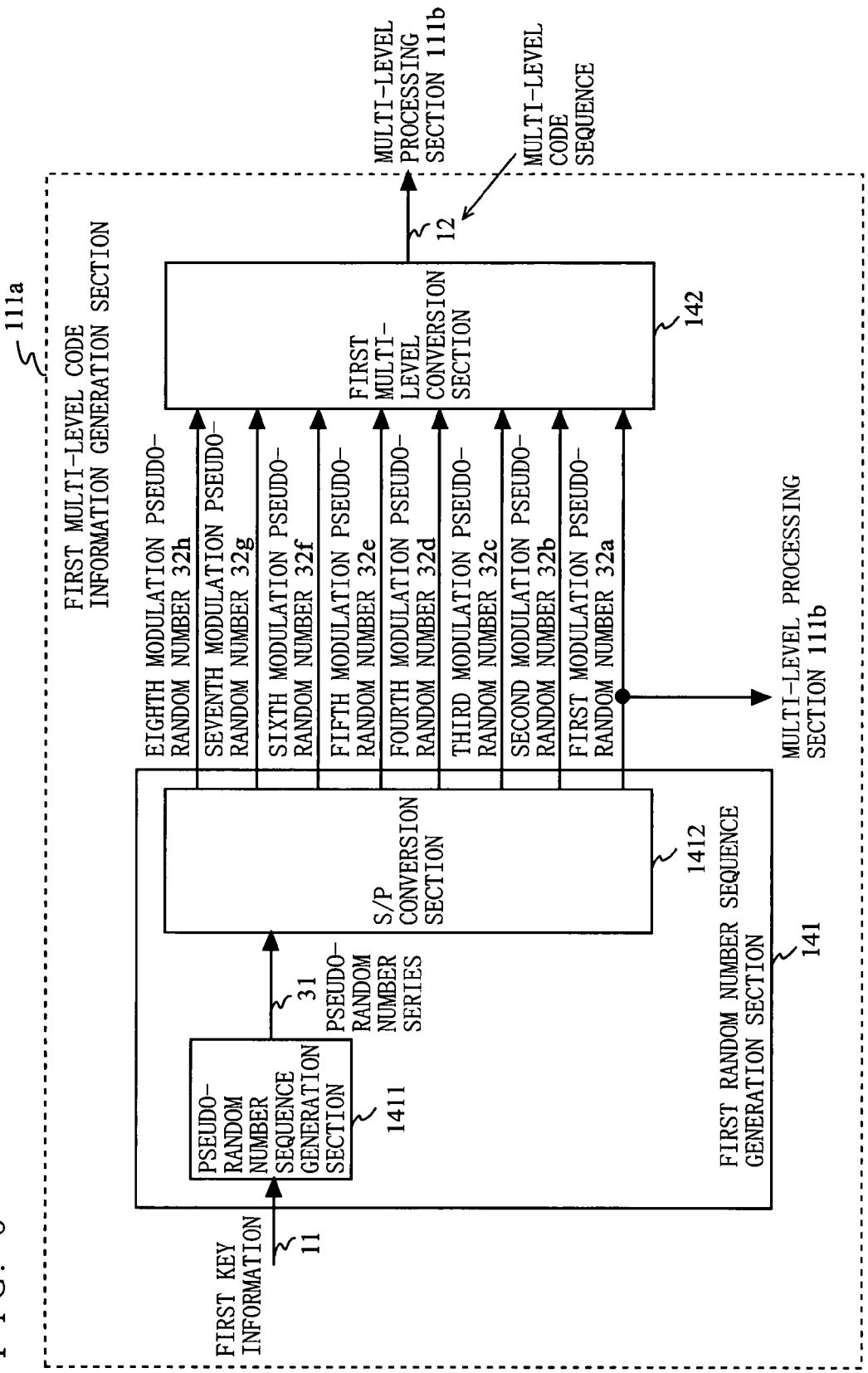
FIG. 6 is a block diagram showing an example of a detailed configuration of a first multi-level code generation section 111$a$ according to a second embodiment of the present invention.

An overall configuration of a data communication apparatus according to a second embodiment of the present invention is the same as that of the data communication apparatus as shown in FIG. 1, and thus description thereof will be omitted. The data communication apparatus according to the second embodiment is different, only with regard to configurations of a first multi-level code generation section 111a and a second multi-level code generation section 212a, from the first embodiment. FIG. 6 is a block diagram showing an example of a detailed configuration of the first multi-level code generation section 111a according to the second embodiment of the present invention. In FIG. 6, the first multi-level code generation section 111a has a first random number sequence generation section 141 and a first multi-level conversion section 142. The first random number sequence generation section 141 includes a pseudo-random number generation section 1411 and a serial/parallel conversion section 1412. Here, an example of a case where the number of bits of the multi-level code sequence 12 is 8 bits (m=8) is shown.

The pseudo-random number generation section 1411 generates, based on inputted first key information 11, a binary pseudo-random number series 31. The serial/parallel conversion section 1412 performs serial/parallel conversion of the pseudo-random number series 31, and outputs first to eighth modulation pseudo-random number sequences 32a to 32h. The first to eighth modulation pseudo-random number sequences 32a to 32h are inputted to the first multi-level conversion section 142. Further, the first modulation pseudo-random number sequence 32a is inputted to the multi-level processing section 111b. The first multi-level conversion section 142 converts the first to eighth modulation pseudo-random number sequences 32a to 32h into the multi-level code sequence 12 having $2^m$ multi-levels, and then outputs the same to the multi-level processing section 111b.

FIG. 7 is a block diagram showing an example of a detailed configuration of the second multi-level code generation section 212a according to the second embodiment of the present invention. In FIG. 7, a configuration of the second multi-level code generation section 212a is basically the same as that of the first multi-level code generation section 111a. Note that, in the second multi-level code generation section 212a, outputs from a serial/parallel conversion section 2412 are referred to as first to eighth demodulation pseudo-random number sequences 42a to 42h. The second multi-level code generation section 212a outputs a multi-level code sequence 17 and the first demodulation pseudo-random number sequence 42a to the decision section 212b.

Figure 8:
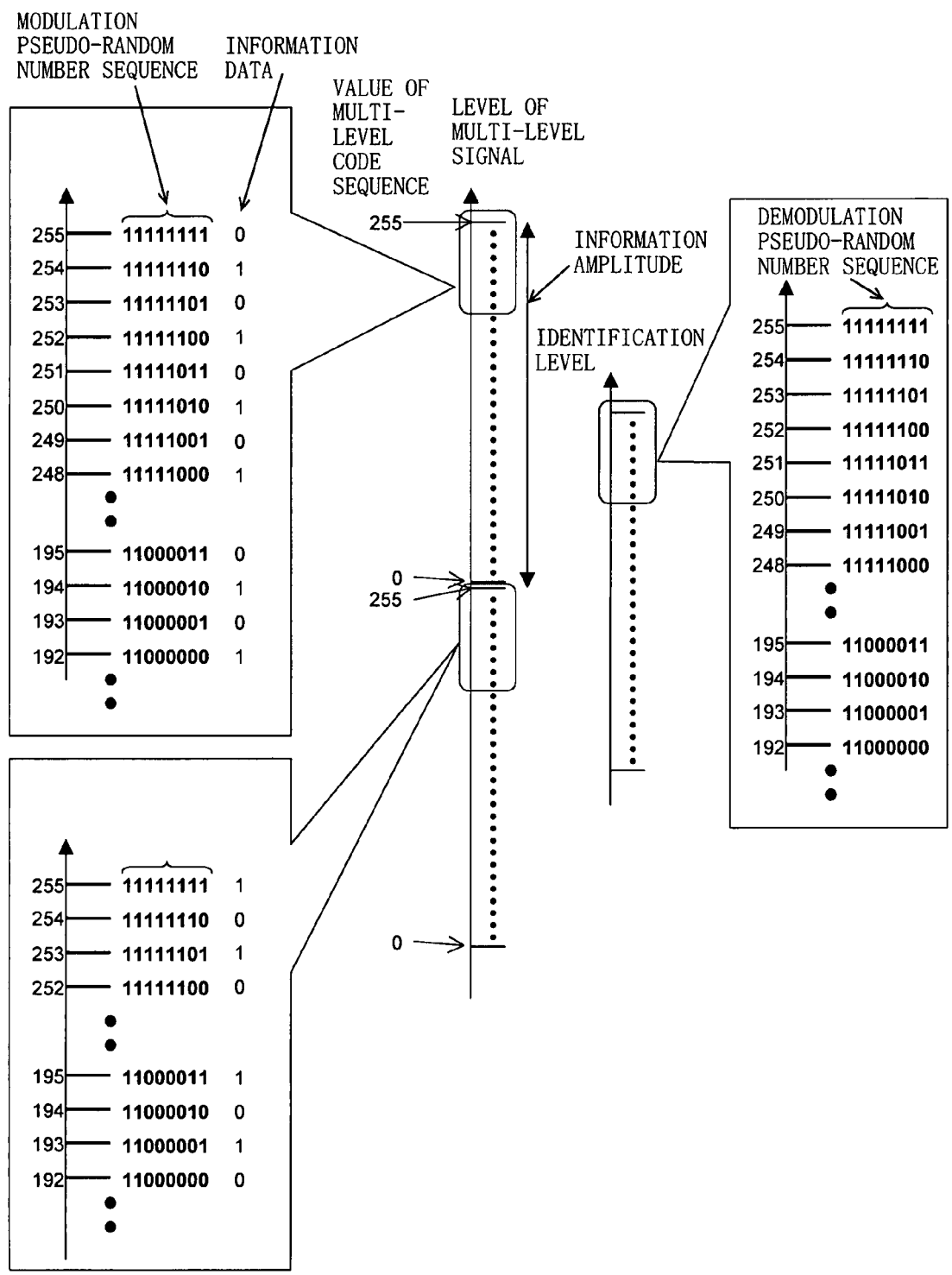
FIG. 8 is a diagram illustrating a signal format used for a data transmitting apparatus according to the second embodiment of the present invention.

FIG. 8 is a diagram illustrating a signal format used for the data transmitting apparatus according to the second embodiment of the present invention. With reference to FIG. 8, a value of the multi-level code sequence 12 used in the present embodiment is determined based on the first to eighth modulation pseudo-random number sequences 32a to 32h. Further, a level of a multi-level signal is determined based on the value of the multi-level code sequence 12 and a value of the information data 10. Further, a step width of the multi-level signal is set to be equal to or smaller than a noise level.

The multi-level processing section 111b allocates respectively adjoining levels of the multi-level signal to different values of the information data 10 ("0" or "1") in an alternate manner. For example, in the levels of the multi-level signal included in an upper half side of FIG. 8, the multi-level processing section 111b allocates the information data "0" in the case where the multi-level code sequence 12 is odd-numbered, and the information data "1" in the case where the multi-level code sequence 12 is even-numbered. Further, in the levels of the multi-level signal included in a lower half side of the FIG. 8, the multi-level processing section 111b allocates the information data "1" in the case where the multi-level code sequence 12 is odd-numbered, and the information data "0" in the case where multi-level code sequence 12 is even-numbered. In other words, a manner of the multi-level processing section 111b relating each of the levels of the multi-level signal to either "0" or "1" is determined based on a value of the first modulation pseudo-random number sequence 32a which corresponds to a lowest-order bit of the multi-level code sequence 12. Accordingly, it becomes impossible for an eavesdropper who does not have key information to identify data directly, and consequently the eavesdropper is forced to try to identify the key information so as to execute eavesdropping by first performing a multi-level determination of all the levels of the multi-level signal.

On the other hand, in the data receiving apparatus, an identification level of a received multi-level signal is determined based on values of the first to eighth demodulation pseudo-random number sequences 42a to 42h. The decision section 212b decides the value of the information data in accordance with a level of the received multi-level signal, the identification level of the multi-level signal, and a value of the first demodulation pseudo-random number sequence 42a.

Specifically, the decision section 212b decides the value of the information data as "1" in the case where the level of the received multi-level signal is larger than the identification level, and the value of the first demodulation pseudo-random number sequence 42a is "0", also in the case where the level of the received multi-level signal is smaller than the identification level, and the value of the first demodulation pseudo-random number sequence 42a is "1". Contrary to this, the decision section 212b decides the value of the information data as "0" in the case where the level of the received multi-level signal is larger than the identification level and the value of the first demodulation pseudo-random number sequence 42a is "1", and also in the case where the level of the received multi-level signal is smaller than the identification level, and the value of the first demodulation pseudo-random number sequence 42a is Note that, the examples of FIG. 6 and FIG. 7 illustrate cases where the number of the modulation pseudo-random number sequences is 8, however, the number of the modulation pseudo-random number sequences is not limited thereto, and can be set arbitrarily.

As above described, according to the present embodiment, in the case where the eavesdropper attempts the multi-level determination of the multi-level signal so as to identify the key information, an error in identification of the multi-level signal will occur, as with a case of the first embodiment, since the step-width of the multi-level signal is set to be equal to or smaller than the noise level. Accordingly, the data communication apparatus according to the second embodiment can crucially deteriorates quality of a receiving signal at the time of eavesdropping by a third party, whereby it is possible to provide a safe data communication apparatus which causes decryption/decoding of the receiving signal to be difficult.

Third Embodiment

In the data communication apparatus according to the second embodiment (see FIG. 6 and FIG. 7), it is necessary to change the first to eighth modulation pseudo-random number sequences 32a to 32h and the value of the multi-level code sequence 12 at the same rate as a bit rate of the information data 10. Here, a rate of a pseudo-random number series 31 (that is, a random number generation rate of a pseudo-random number generation section 1411) is obtained from a product of the bit rate of the information data 10 and the number of the bits of the multi-level code sequence 12. Therefore, the random number generation rate of the pseudo-random number generation section 1411 increases as the number of multi-levels of the multi-level code sequence 12 increases. On the other hand, a receiving SN ratio of an eavesdropper deteriorates as the number of the multi-levels increases, and thus the more the number of the multi-levels increases, the more significant identification error the eavesdropper will incur. Accordingly, the more the number of the multi-levels are increased for the sake of security, the more the random number generation rate required to the pseudo-random number generation section 1411 is increased, which lead to a problem in that it is difficult to realize such pseudo-random number generation section 1411. The present embodiment aims to solve such problem.

An overall configuration of a data communication apparatus according to a third embodiment of the present invention is the same as that of the data communication apparatus as shown in FIG. 1, and thus description thereof will be omitted. The data communication apparatus according to the third embodiment is different, only with regard to configurations of a first multi-level code generation section 111a and a second multi-level code generation section 212a, from the second embodiment. Hereinafter, component parts which are the same as those of the second embodiment are omitted by providing common reference characters, and the data communication apparatus according to the third embodiment will be described by mainly focusing such components parts that are different from those of the second embodiment.

Figure 9:
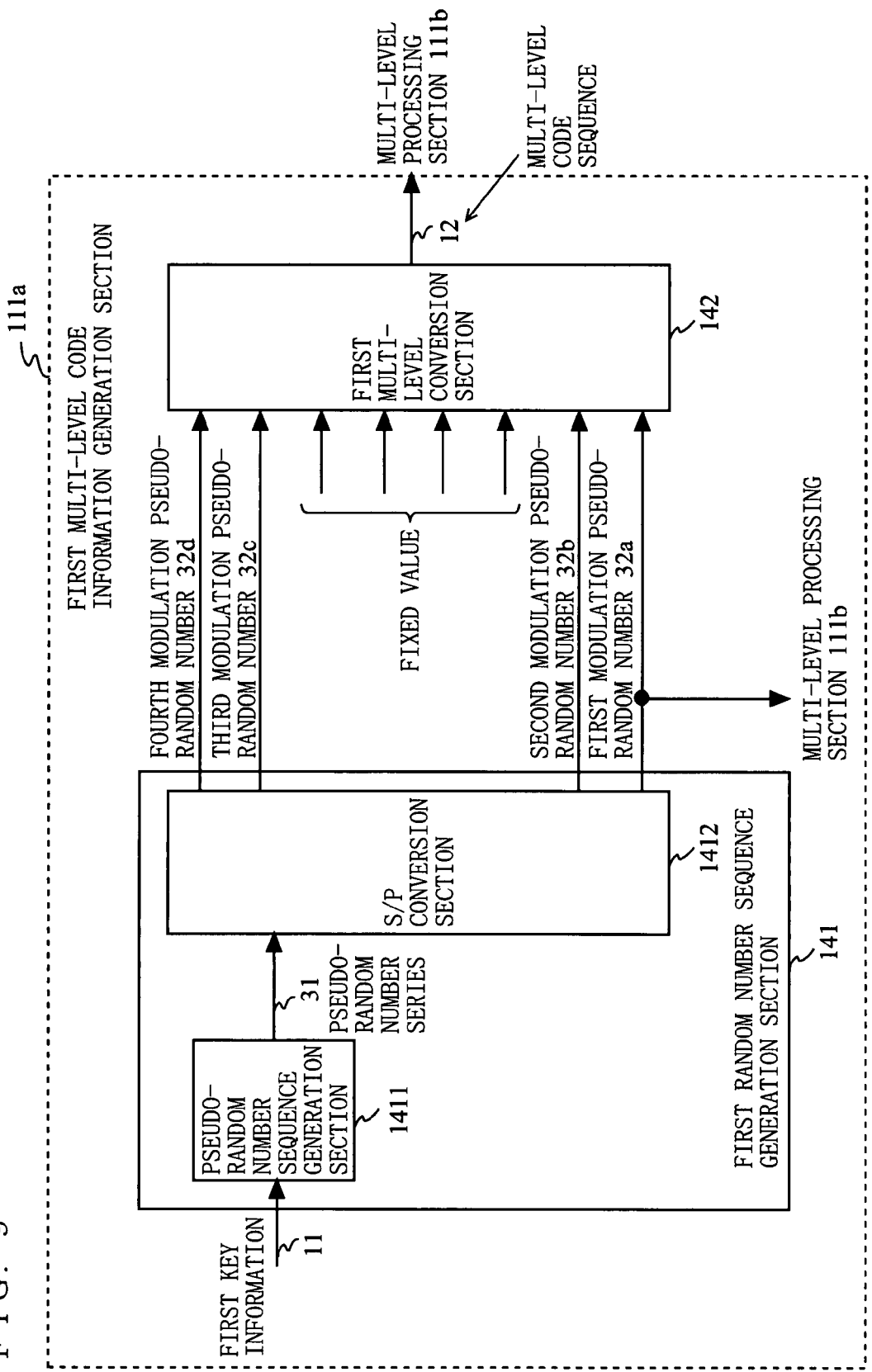
FIG. 9 is a block diagram showing an example of a detailed configuration of a first multi-level code generation section 111a according to a third embodiment of the present invention.

FIG. 9 is a block diagram showing an example of a detailed configuration of the first multi-level code generation section 111a according to the third embodiment of the present invention. In FIG. 9, the first multi-level code generation section 111a has a first random number sequence generation section 141 and a first multi-level conversion section 142. The first random number sequence generation section 141 includes a pseudo-random number generation section 1411 and a serial/parallel conversion section 1412. Here, an example of a case where the number of bits of the multi-level code sequence 12 is 8 bits (m=8) is shown.

In the first multi-level code generation section 111a, the pseudo-random number generation section 1411 generates, in a similar manner to the second embodiment (see FIG. 6), a binary pseudo-random number series 31 in accordance with the first key information 11. The serial/parallel conversion section 1412 performs serial/parallel conversion of the pseudo-random number series 31 and outputs first to fourth modulation pseudo-random number sequences 32a to 32d. Here, the number of the modulation pseudo-random number sequences outputted from the serial/parallel conversion section 1412 is smaller than the number of bits of a bit sequence to be inputted to the first multi-level conversion section 142 (that is, an input bit sequence). The first to fourth modulation pseudo-random number sequences 32a to 32d are inputted to the first multi-level conversion section 142 as a part of the input bit sequence. For example, as shown in FIG. 9, the modulation pseudo-random number sequences 32a and 32b, and the modulation pseudo-random number sequences 32c and 32d are inputted to low-order 2 bits and to high-order 2 bits, respectively, of an 8-bit input bit sequence. Fixed values are inputted to remaining parts of the input bit sequence. The first multi-level conversion section 142 converts the inputted bit sequences into the multi-level code sequence 12 having $2^m$ multi-levels and then outputs the same to the multi-level processing section 111b.

Figure 10:
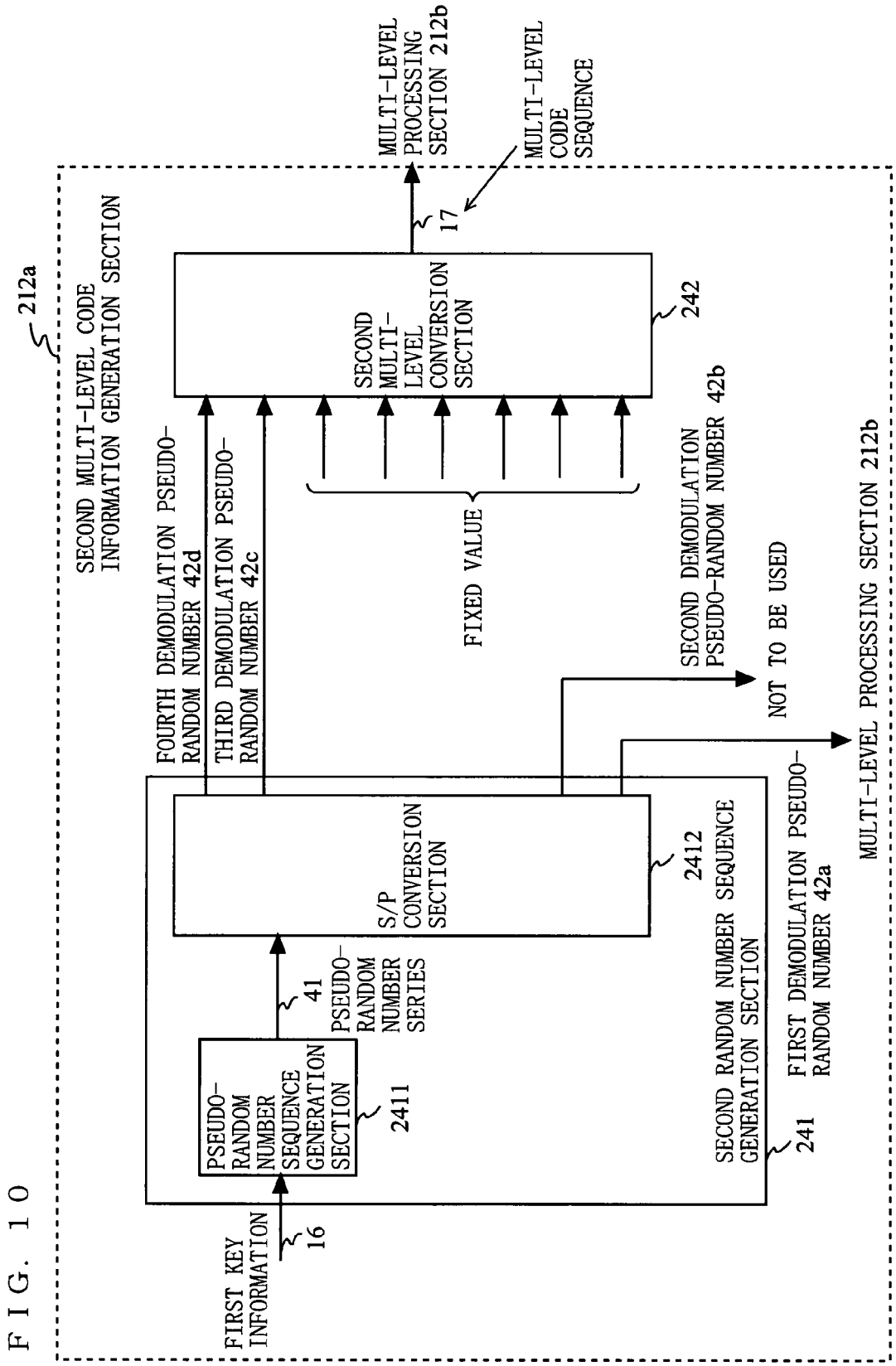
FIG. 10 is a block diagram showing an example of a detailed configuration of a second multi-level code generation section 212a according to the third embodiment of the present invention.

FIG. 10 is a block diagram showing an example of a detailed configuration of the second multi-level code generation section 212a according to the third embodiment of the present invention. In FIG. 10, the second multi-level code generation section 212a has a second random number sequence generation section 241 and a second multi-level conversion section 242. The second random number sequence generation section 241 includes a pseudo-random number generation section 2411 and a serial/parallel conversion section 2412.

In the second multi-level code generation section 212a, the pseudo-random number generation section 2411 generates and outputs, based on the second key information 21, a binary pseudo-random number series 41. The serial/parallel conversion section 2412 performs serial/parallel conversion of the pseudo-random number series 41, and outputs first to fourth demodulation pseudo-random number sequences 42a to 42d.

Here, the number of the demodulation pseudo-random number sequences outputted from the serial/parallel conversion section 2412 is smaller than the number of bits of a bit sequence to be inputted to the second multi-level conversion section 242 (that is, the input bit sequence). A part of the demodulation pseudo-random number sequences outputted from the serial/parallel conversion section 2412 is inputted to the second multi-level conversion section 242 as a part of the input bit sequence.

For example, as shown in FIG. 10, the third and the fourth demodulation pseudo-random number sequences 42c and 42d are inputted to the second multi-level conversion section 242 as high-order bits of the input bit sequence. It is preferable that a position in the input bit sequence to the second multi-level conversion section 242 to which the demodulation pseudo-random number sequences are to be inputted is the same as that of a high-order bit in the input bit to the first multi-level conversion section 142 to which the modulation pseudo-random number sequences are inputted. Fixed values are inputted to remaining bit sequence positions of the input bit sequence to the second multi-level conversion section 242 to which the demodulation pseudo-random number sequences are not inputted. The second multi-level conversion section 242 converts the input bit sequence into the multi-level code sequence 22 having $2^m$ multi-levels and then outputs the same.

Figure 11:
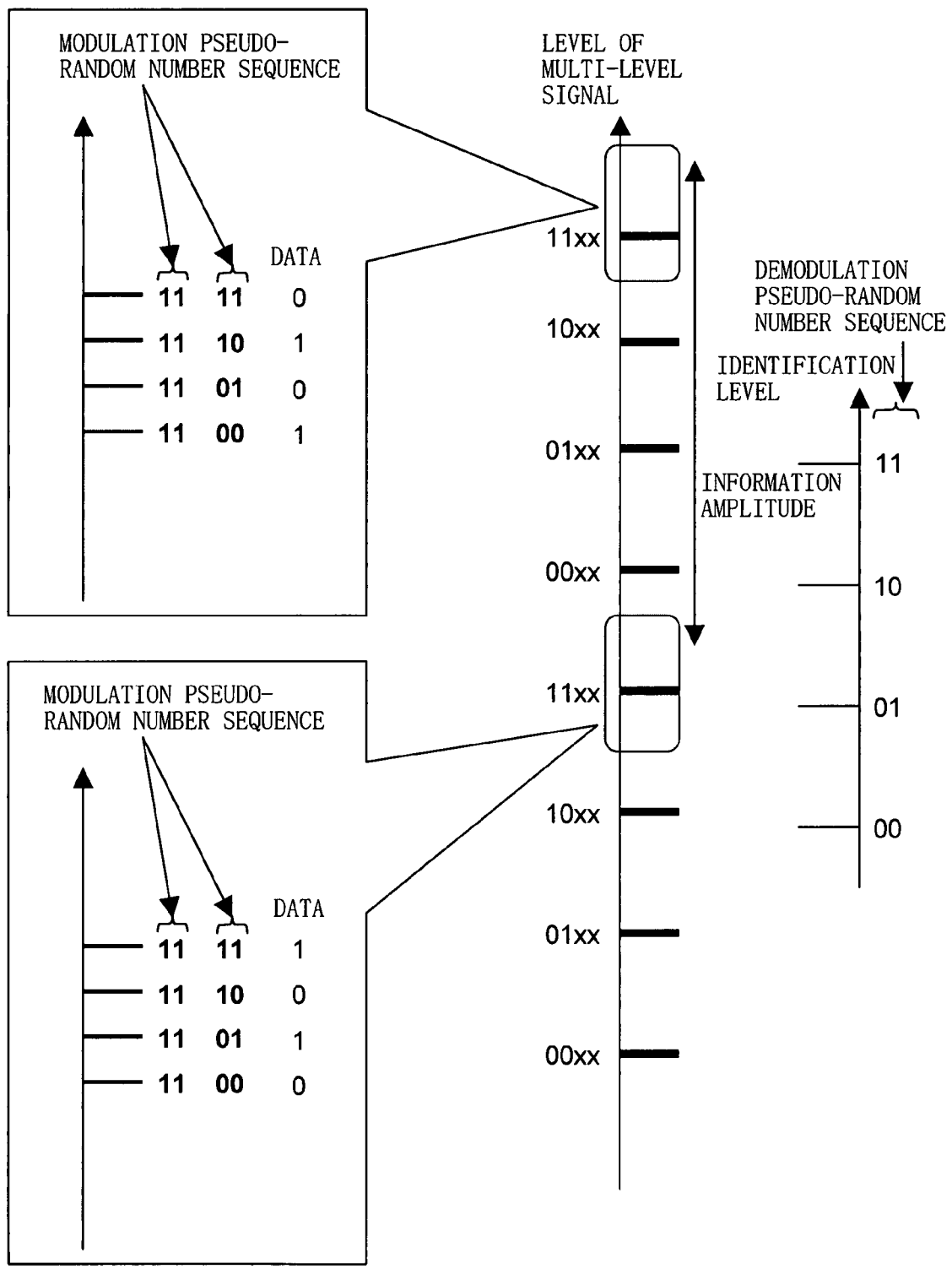
FIG. 11 is a diagram illustrating a signal format used for a data transmitting apparatus according to the third embodiment of the present invention.

FIG. 11 is a diagram illustrating a signal format used for a data transmitting apparatus according to the third embodiment of the present invention. With reference to FIG. 11, in the case where four bits of the input bit sequence to the first multi-level conversion section 142 are fixed values, the number of the levels which the multi-level code sequence 12 may actually obtain is 16. The level of the multi-level signal is determined based the multi-level code sequence 12 and a value of the information data 10 ("0" or "1"), and thus the number of the levels which the multi-level signal 13 may obtain is 32. These levels are divided into 8 groups respectively having four levels respectively including values which are close to one another. A step width of the multi-level signal in each of the groups is set to be equal to or smaller than a noise level. Further, it is preferable that a difference between a highest-order level and a lowest-order level in each of the groups is equal to or smaller than the noise level.

Further, the multi-level processing section 111b allocates, in each of the groups, respectively adjoining levels of the multi-level signal to different values of the information data 10 ("0" or "1") in an alternate manner. For example, in the levels of the multi-level signal included in an upper-half side as shown in FIG. 11, the multi-level processing section 111b allocates the information data "0" in the case where the multi-level code sequence 12 is odd-numbered, and allocates the information data "1" in the case where the multi-level code sequence 12 is even-numbered. Further, in the levels of the multi-level signal included in a lower-half side as shown in FIG. 11, the multi-level processing section 111b allocates the information data "1" in the case where the multi-level code sequence 12 is odd-numbered, and allocates the information data "0" in the case where the multi-level code sequence 12 is even-numbered. In other words, a manner in which the multi-level processing section 111b relates each of the levels of the multi-level signal to either of "0" or "1" is determined based on a value of the first modulation pseudo-random number sequence 32a which corresponds to a lowest-order bit of the multi-level code sequence 12.

On the other hand, in a data receiving apparatus, an identification level of a received multi-level signal is determined based on values of the third and the fourth demodulation pseudo-random number sequences 42c and 42d. The data receiving apparatus may also use values of the first and the second demodulation pseudo-random number sequences 42a and 42b when determining the identification level, however, since fluctuation of the identification level corresponding to the values is small, an error rate after identification will not deteriorate even if the identification level is determined with the fluctuation being ignored. The decision section 212b decides the value of the information data in accordance with the level of the received multi-level signal, the identification level of the multi-level signal, and the value of the first demodulation pseudo-random number sequence 42a.

Specifically, the decision section 212b decides the value of the information data as "1" in the case where the level of the received multi-level signal is greater than the identification level and the value of the first demodulation pseudo-random number sequence 42a is "0", and also in the case where the level of the received multi-level signal is smaller than the identification level and the value of the first demodulation pseudo-random number sequence 42a is "1". On the other hand, the decision section 212b decides the value of the information data as "0" in the case where the level of the received multi-level signal is greater than the identification level and the value of the first demodulation pseudo-random number sequence 42a is "1", and also in the case where the level of the received multi-level signal is smaller than the identification level and the value of the first demodulation pseudo-random number sequence 42a is "0".

The random number generation rate required to the pseudo-random number generation section 1411 in the configuration of FIG. 9 is four times of the bit rate of the information data 10, since the number of output bits (the number of the modulation pseudo-random number sequences) of the serial/parallel conversion section 1412 is four, and compared to the case of the configuration of FIG. 6 (8 times of the bit rate of the information data 10), the random number generation rate of the pseudo-random number generation section 1411 can be halved.

Note that the fluctuation of the levels of the multi-level signal corresponding to the first and the second demodulation pseudo-random number sequences 42a and 42b which are not used for generating the identification level leads to a deterioration of a signal level, that is, an deterioration of an SN ratio, at the time of identification. However, if such deteriorated SN ratio is set so as to satisfy a required value of the data receiving apparatus 1201, a legitimate receiving party can identify the multi-level signal without an error. That is, a ratio of a information amplitude to a fluctuation width of the multi-level signal corresponding to the low-order bits of the demodulation pseudo-random number sequences is set so as to satisfy a condition of being greater than the SN ratio acceptable to the legitimate receiving party. The SN ratio acceptable to the legitimate receiver is determined based on a bit error rate of data required by the legitimate receiving party. For example, in optical communications, a value equal to or smaller than $10^{-12}$ are generally used, as an acceptable bit error rate, and for this case, acceptable SN rate is equal to or more than 23 dB.

Further, in the example of FIG. 9, the number of input bits to the first multi-level conversion section 142 is 8 bits, and the number of the modulation pseudo-random number sequences is four, and the example shows that the modulation pseudo-random number sequences are inputted to the high-order 2 bits and low-order 2 bits of the input bit sequence to the first multi-level conversion section 142, but is merely one example. The number of input bits to the first multi-level conversion section 142 is arbitrary, and the numbers of the modulation pseudo-random number sequences and the demodulation pseudo-random number sequences can be set arbitrarily in accordance with a ratio of a feasible random number generation rate to a required bit rate. Further, the number of the modulation pseudo-random number sequences to be allocated to the high-order bits and low-order bits of the input bit to the first multi-level conversion section 142 can be set arbitrarily if it satisfies a condition where any of the modulation pseudo-random number sequences is definitely inputted to the lowest-order bit of the input bit sequence.

As above described, according to the present embodiment, in the case where the eavesdropper attempts a multi-level determination of the multi-level signal so as to identify the key information, an identification error of the multi-level signal occurs in the similar manner to the first embodiment since the step width of the multi-level signal in a single group is set to be equal to or smaller than the noise level. Further, the signal levels of the multi-level signal is allocated appropriately, whereby it is possible to keep, at a low level, an increase in the random number generation rate required to the pseudo-random number generator, thereby improving the security. Therefore, the data communication apparatus according to the third embodiment can crucially deteriorates quality of a receiving signal at the time of eavesdropping by a third party, whereby it is possible to provide a safe data communication apparatus which causes decryption/decoding of the receiving signal to be difficult.

Fourth Embodiment

An overall configuration of a data communication apparatus according to a fourth embodiment of the present invention is the same as that of the data communication apparatus as shown in FIG. 1, and thus description thereof will be omitted. The data communication apparatus according to the fourth embodiment is different, only with regard to a configuration of a first multi-level code generation section 111a, from the third embodiment. Hereinafter, component parts which are the same as those of the third embodiment are omitted by providing common reference characters, and the data communication apparatus according to the fourth embodiment will be described by mainly focusing such components parts that are different from those of the third embodiment.

Figure 12:
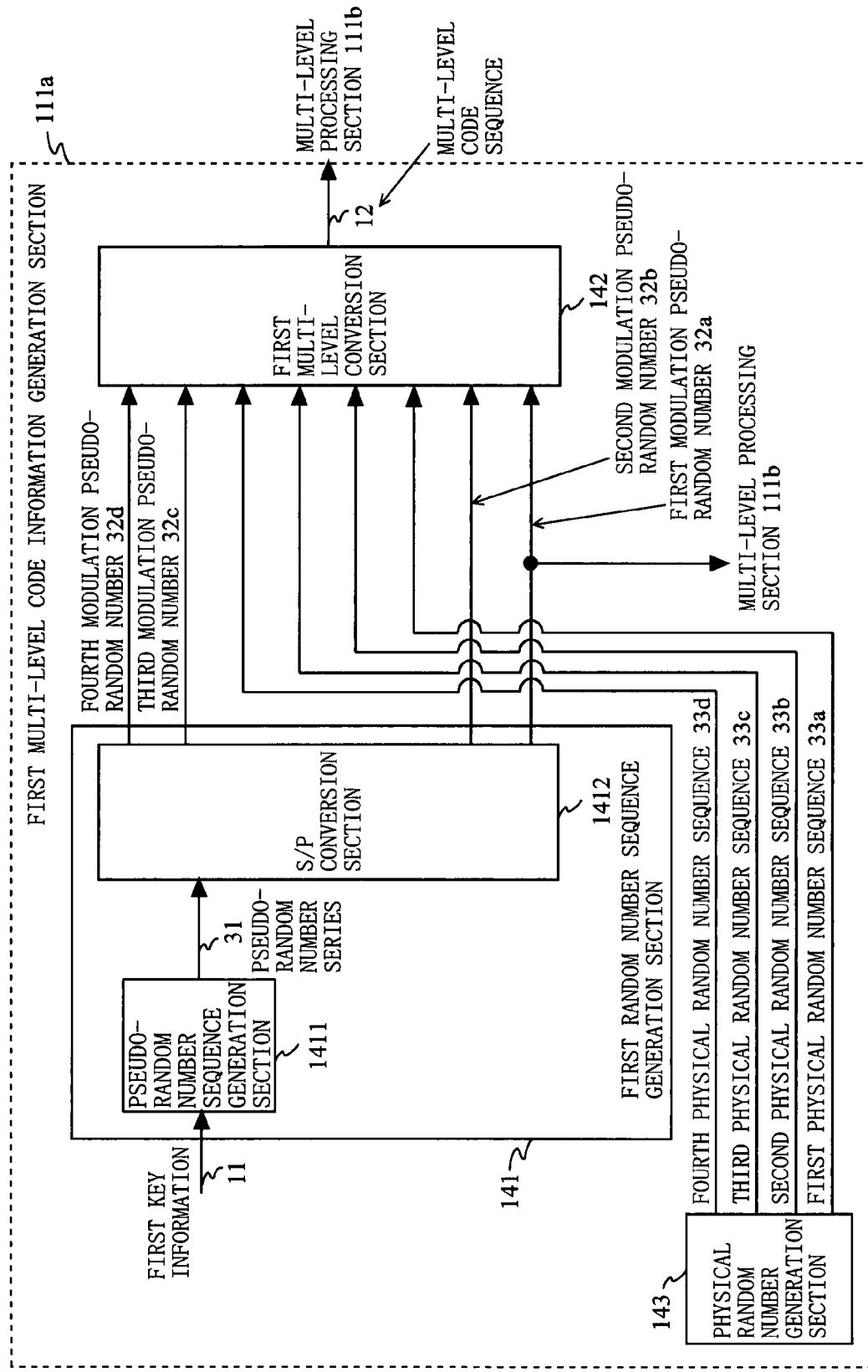
FIG. 12 is a block diagram showing an example of a detailed configuration of a first multi-level code generation section 111a according to a fourth embodiment of the present invention.

FIG. 12 is a block diagram showing an example of a detail configuration of the first multi-level code generation section 111a according to the fourth embodiment of the present invention. In FIG. 12, the first multi-level code generation section 111a has a first random number sequence generation section 141, first multi-level conversion section 142, and a physical random number generation section 143. The first random number sequence generation section 141 includes a pseudo-random number generation section 1411 and a serial/parallel conversion section 1412. Here, an example of a case where the number of bits of the multi-level code sequence 12 is 8 bits (m=8) is shown. A second multi-level code generation section 212a in the present embodiment has a configuration as shown in FIG. 7, as with the second embodiment.

Next, an action of the data communication apparatus according to the present embodiment will be described. Actions of the pseudo-random number generation section 1411 and the serial/parallel conversion section 1412 are the same as those of the second embodiment. The physical random number generation section 143 generates and outputs one or a plurality of physical random number sequences. In the example of FIG. 12, the physical random number generation section 143 outputs first to fourth physical random number sequences 33a to 33d. Here, the number of modulation pseudo-random number sequences 32a to 32d outputted from the serial/parallel conversion section 1412 is set so as to be smaller than the number of bits of the input bit sequence to the first multi-level conversion section 142. The first to fourth modulation pseudo-random number sequences 32a to 32d are inputted as a part of the input bit sequence to the first multi-level conversion section 142. The first to the fourth physical random number sequences 33a to 33d are inputted to a remaining part of the input bit sequence. The first multi-level conversion section 142 converts the input bit sequence into a multi-level code sequence 12 having $2^m$ multi-levels and outputs the same.

Figure 13:
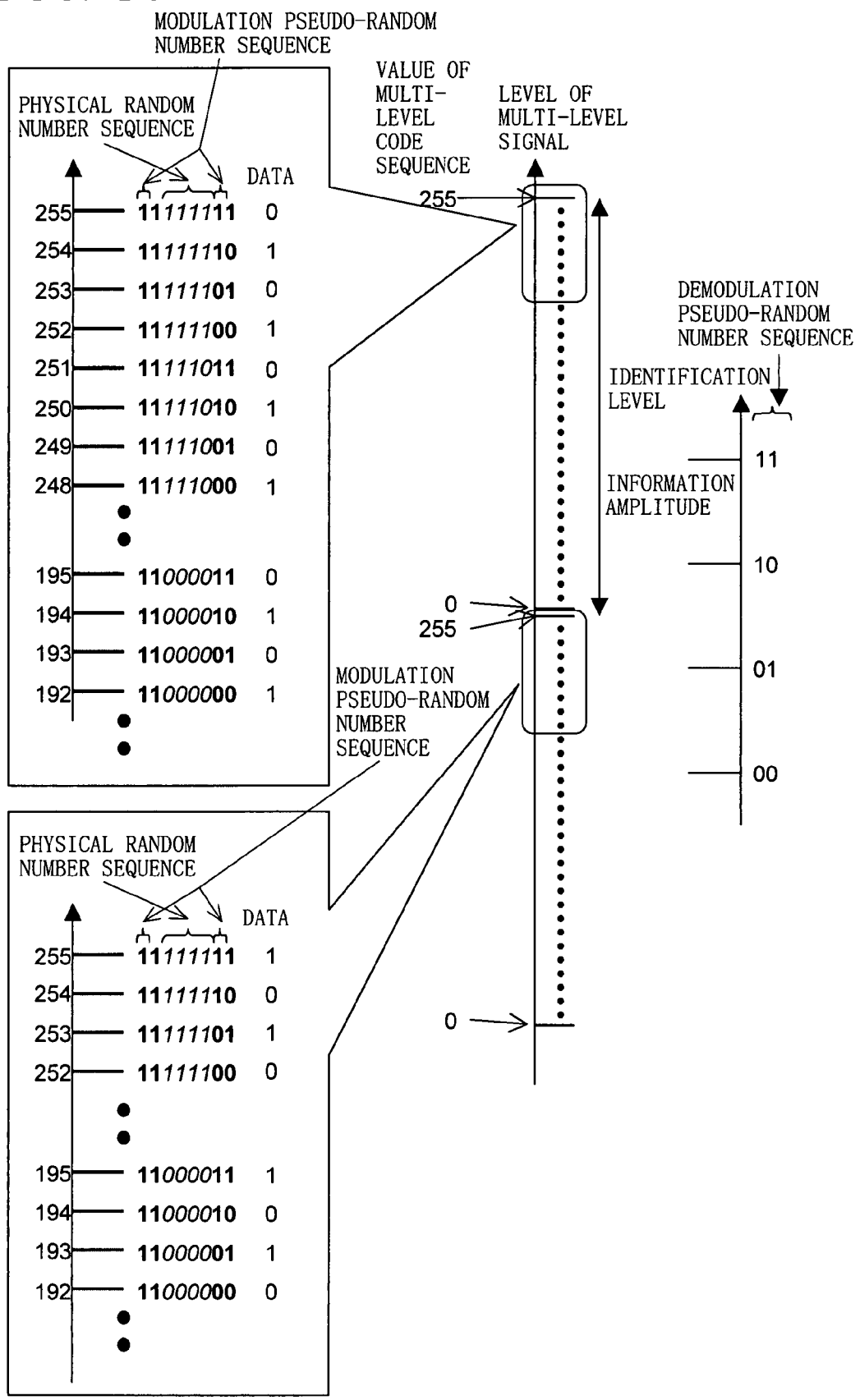
FIG. 13 is a diagram illustrating a signal format used for a data transmitting apparatus according to the fourth embodiment of the present invention.

FIG. 13 is a diagram illustrating a signal format used for the data transmitting apparatus according to the fourth embodiment of the present invention. The signal format as shown in FIG. 13 corresponds to the configuration of the first multi-level code generation section 111a as shown in FIG. 12. With reference to FIG. 13, the first multi-level code generation section 111a determines high-order 2 bits and low-order 2 bits of 8 bits of the multi-level code sequence 12, in accordance with the modulation pseudo-random number sequences 32a to 32d, and also determines intermediate 4 bits in accordance with the physical random number sequences 33a to 33d. Therefore, the number of levels of the multi-level code sequence corresponding to the first to fourth modulation pseudo-random number sequences 32a to 32d is 16. A step width of the multi-level signal is set to be equal to or smaller than a noise level. Further, respectively adjoining levels of the multi-level signal are allocated to different values of the information data.

On the other hand, in a data receiving apparatus, an identification level of a received multi-level signal is determined, in a similar manner to the second embodiment, based on values of the third and the fourth demodulation pseudo-random number sequences 42c and 42d. In the decision section 212b, a value of the information data is decided based on the level of the multi-level signal, the identification level of the multi-level signal, and the value of the first demodulation pseudo-random number sequence 42a.

Specifically, the decision section 212b decides the value of the information data as "1" in the case where the level of the received multi-level signal is greater than the identification level and the value of the first demodulation pseudo-random number sequence 42a is "0", and also in the case where the level of the received multi-level signal is smaller than the identification level and the value of the first demodulation pseudo-random number sequence 42a is "1". On the other hand, the decision section 212b decides the value of the information data as "0" in the case where the level of the received multi-level signal is greater than the identification level and the value of the first demodulation pseudo-random number sequence 42a is "1", and also in the case where the level of the received multi-level signal is smaller than the identification level and the value of the first demodulation pseudo-random number sequence 42a is "0".

Note that fluctuation of the levels of the multi-level signal corresponding to the first to the fourth physical random number sequences which are not used for generating the identification level leads to a deterioration of a signal level, that is, a deterioration of an SN ratio, at the time of identification. However, if such deteriorated SN ratio is set so as to satisfy a required value of the data receiving apparatus 1201, a legitimate receiving party can identify the multi-level signal without error. That is, a ratio of a information amplitude to a fluctuation width of the multi-level signal corresponding to the physical random number sequence is required to be set so as to satisfy a condition of being greater than the SN ratio acceptable to the legitimate receiving party.

Figure 14A:
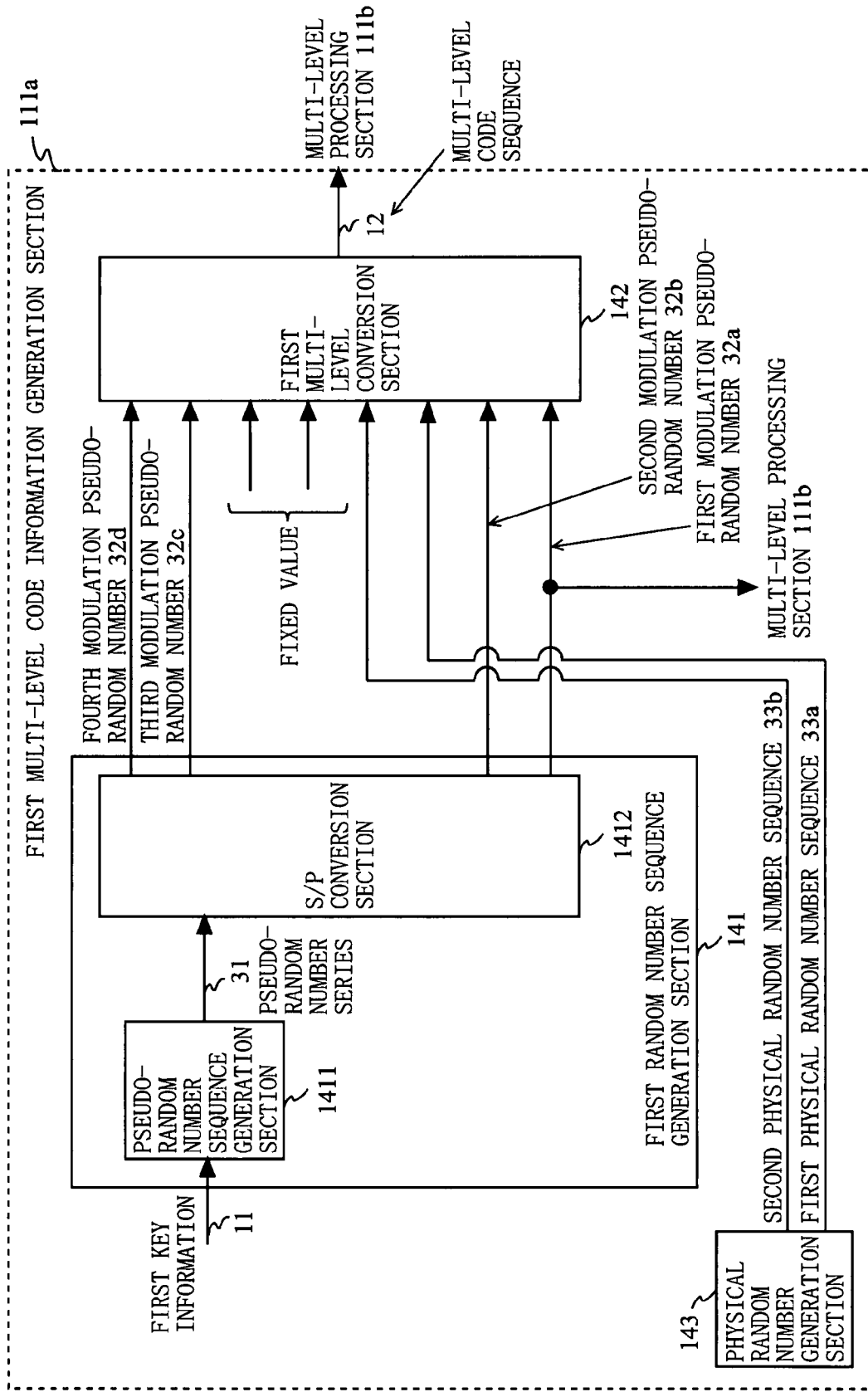
FIG. 14A is a block diagram showing an example of another configuration of the first multi-level code generation section 111a according to the fourth embodiment of the present invention.
Figure 15:
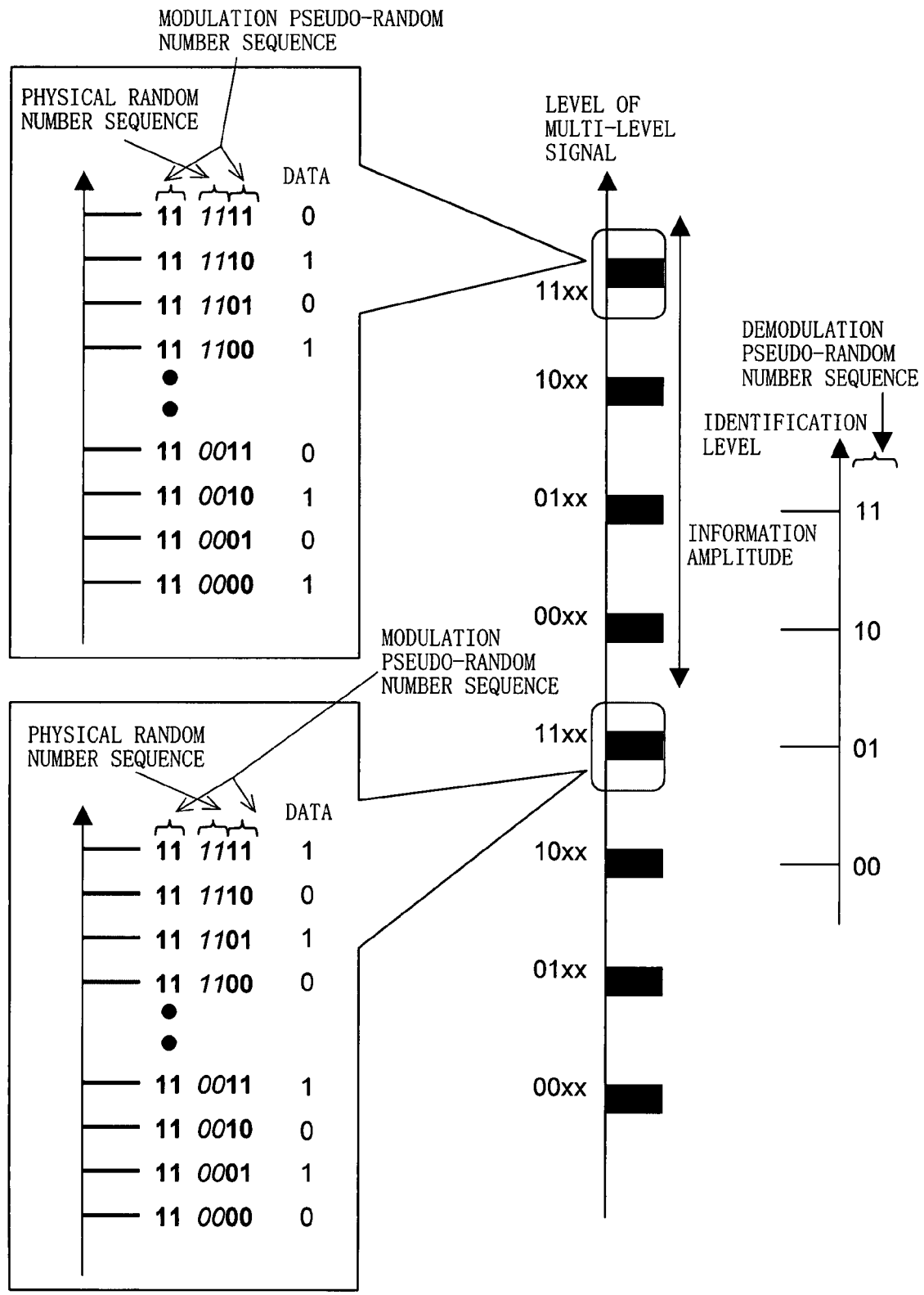
FIG. 15 is a diagram illustrating another signal format used for the data transmitting apparatus according to the fourth embodiment of the present invention.

As a configuration which can obtain the same effect as the first multi-level code generation section 111 as shown in FIG. 12, a configuration as shown in FIG. 14A may be considered. FIG. 14A is a block diagram showing an example of another configuration of the first multi-level code generation section 111a according to the fourth embodiment of the present invention. FIG. 14A is the same, with regard to functional blocks and actions thereof contained in the configuration, as FIG. 12, but is different from FIG. 12 in that FIG. 14A includes a bit sequence, as the input bit sequence to the first multi-level conversion section 142, to which not only the modulation pseudo-random number sequences 32a to 32c and the physical random number sequences 33a to 33b but also fixed values are inputted. FIG. 15 illustrates a multi-level signal format in this exemplary configuration. In this case, fixed values are allocated to 2 bits of the input bit sequence to the first multi-level conversion section 142, the number of levels which the multi-level code sequence 12 may obtain is 64. Since the level of the multi-level signal corresponds to the multi-level code sequence 12 and the value of the information data 10 ("0" or "1"), the number of the level to be obtained is 128. These levels are divided into 8 groups respectively having 16 levels respectively including values which are close to one another. The step width of the multi-level signal in each of the groups is set to be equal to or smaller than the noise level. Further, in each of the groups, respectively adjoining levels of the multi-level signal are allocated to different values of the information data. On the other hand, the identification level is determined, in a similar manner to a case of FIG. 9, based on the values of the third and the fourth demodulation pseudo-random number sequences 42c and 42d.

Further, as a configuration which can obtain the same effect as the first multi-level code generation section 111a as shown in FIG. 12, a configuration as shown in FIG. 14A may be considered. FIG. 14B is a block diagram showing an example of another configuration of the first multi-level code generation section 111a according to the fourth embodiment of the present invention. FIG. 14B is basically the same, with regard to functional blocks and actions thereof contained in the configuration, as FIG. 12, but is different from FIG. 12 in that, as a part of the input bit sequence to the first multi-level conversion section 142, signals generated based on a predetermined rule are inputted instead of the physical random number sequences 33a to 33d. In the example as shown in FIG. 14B, signals, which are generated by providing predetermined delay time to the modulation pseudo-random number sequences 32a to 32c, are inputted to the first multi-level conversion section 142 as the signals generated based on the predetermined rule.

Note that the examples of FIG. 9 and FIG. 10 shows that the number of input bits to the first multi-level conversion section 142 is 8 bit, and the numbers of the modulation pseudo-random number sequences and the demodulation pseudo-random number sequences are respectively four, and the modulation pseudo-random number sequences are inputted to the high-order 2 bits and the low-order 2 bits of the input bit sequence to the first multi-level conversion section 142, but these are merely one examples, respectively. The number of the input bits to the first multi-level conversion section 142 is arbitrary, and the numbers of the modulation pseudo-random number sequences and the demodulation pseudo-random number sequences can be set arbitrarily in accordance with a ratio of a feasible random number generation rate to a required bit rate. Further, the number of the physical random number sequences can be set arbitrarily if the number of the same is equal to or smaller than a difference between the number of the input bits to the first multi-level conversion section 142 and the number of the modulation pseudo-random number sequences. Further, selection of whether either of the modulation pseudo-random number sequence or the physical random number sequence, or the fixed value is to be inputted to respective positions of the input bit sequence can be set arbitrarily if it satisfies a condition where the modulation pseudo-random number sequence is definitely inputted to the lowest-order bit of the input bit sequence.

As above described, according to the present embodiment, the number of the levels which the multi-level signal may obtain is greater than the third embodiment, and thus the number of the levels of the multi-level signal which is likely to be identified erroneously at the time of the multi-level determination by the eavesdropper also increases, whereby eavesdropping will become difficult. Further, it is possible to keep, at a low level, an increase in the random number generation rate required to the pseudo-random number generator, thereby improving the security. Therefore, the data communication apparatus according to the fourth embodiment can crucially deteriorates quality of a receiving signal at the time of eavesdropping by a third party, whereby it is possible to provide a safe data communication apparatus which causes decryption/decoding of the receiving signal to be difficult.

Fifth Embodiment

The fifth embodiment of the present invention aims to keep a pseudo-random number generation rate constant and to transmit information data 10 at different bit rates. An overall configuration of a data communication apparatus according to the fifth embodiment of the present invention is the same as that of the data communication apparatus as shown in FIG. 1, and thus description thereof will be omitted. The data communication apparatus according to the fifth embodiment is different, only with regard to configurations of a first random number sequence generation section and a second random number sequence generation section 241, from the third embodiment. Hereinafter, component parts which are the same as those of the third embodiment are omitted by providing common reference characters, and the data communication apparatus according to the third embodiment will be described by mainly focusing such components parts that are different from those of the third embodiment.

Figure 16:
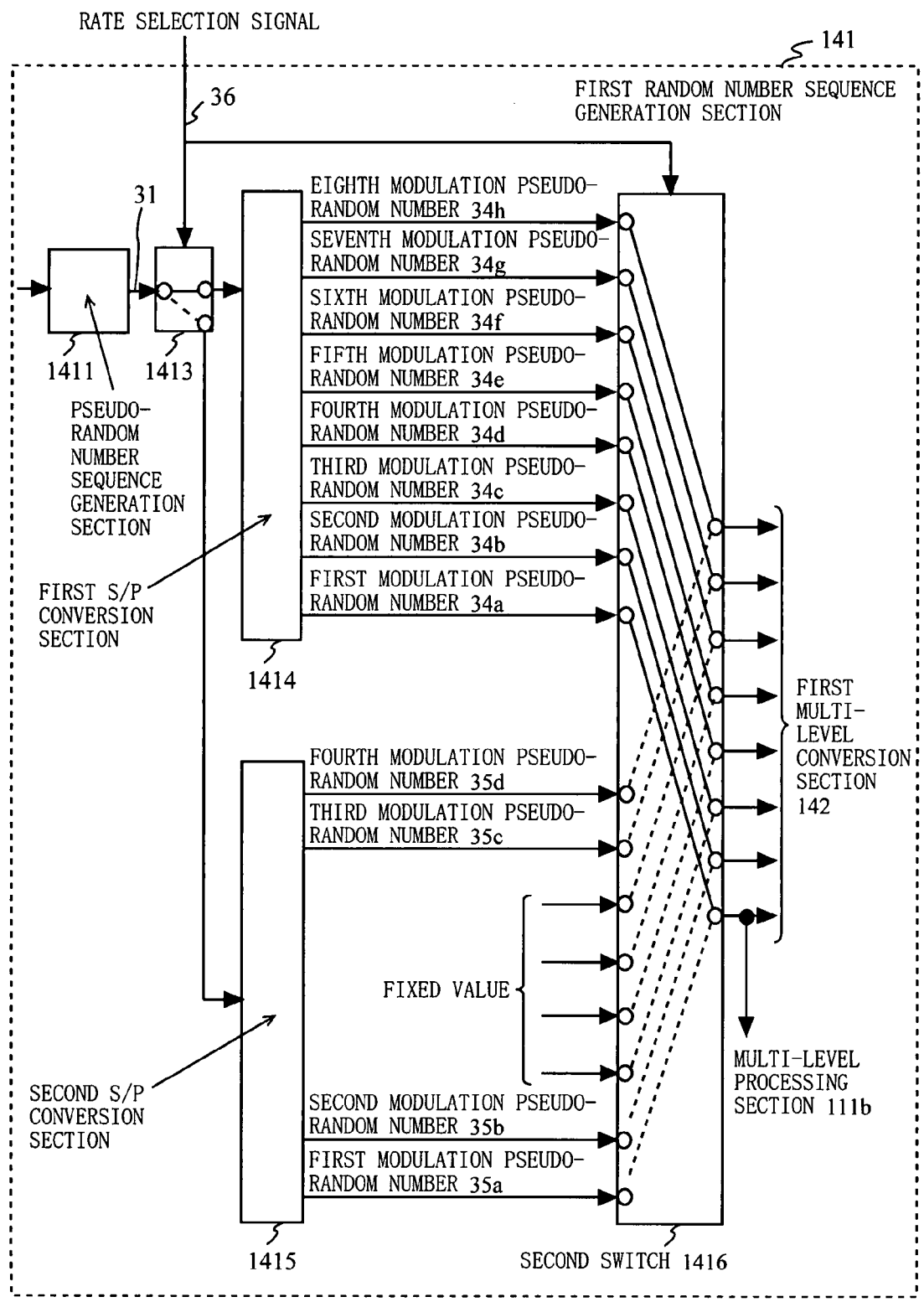
FIG. 16 is a block diagram showing an example of a detailed configuration of a first random number sequence generation section 141 according to a fifth embodiment of the present invention.
Figure 17:
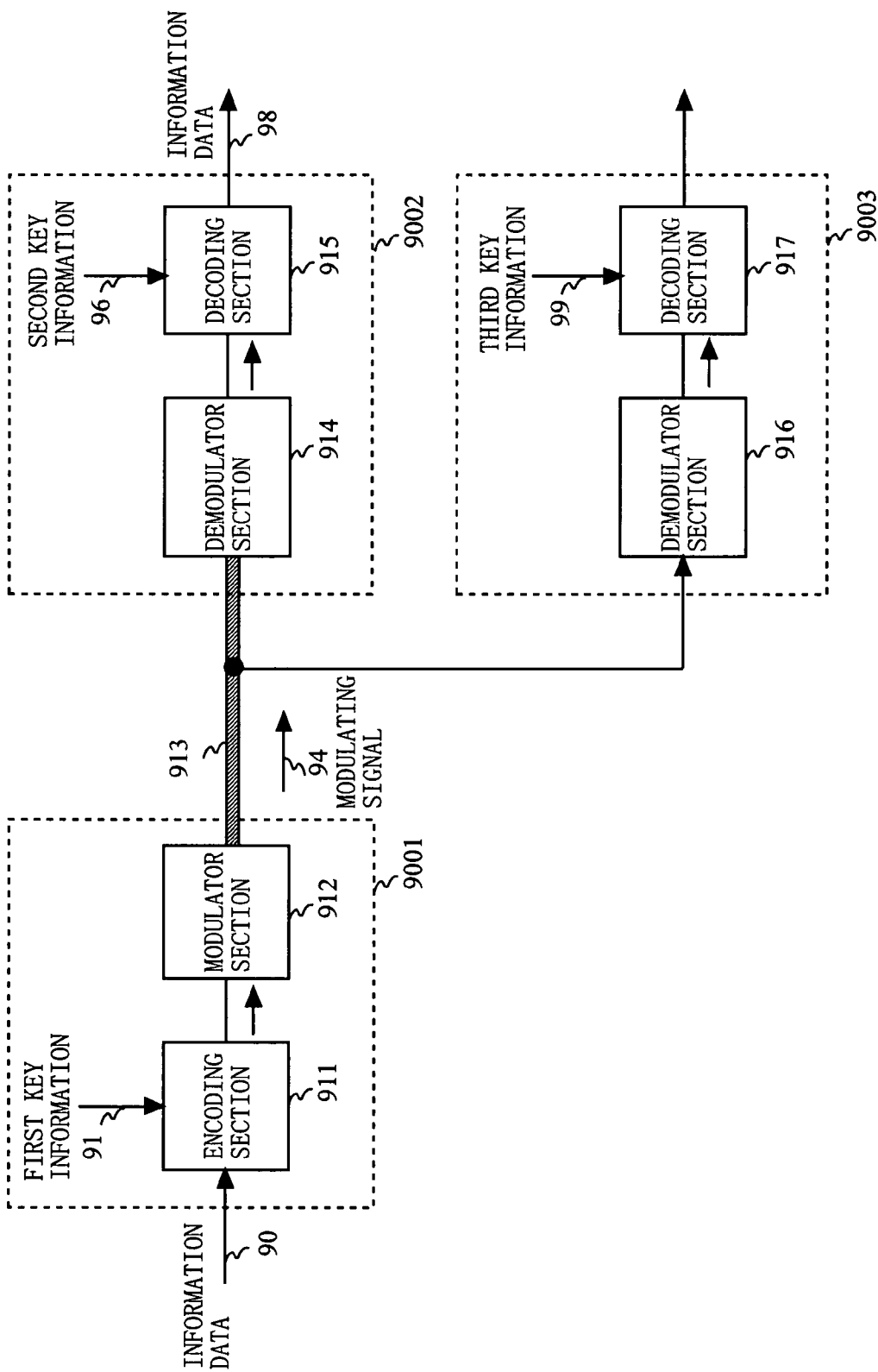
FIG. 17 is a block diagram showing a configuration of a conventional data communication apparatus.

FIG. 16 is a block diagram showing an example of a detail configuration of the first random number sequence generation section 141 according to the fifth embodiment of the present invention. In FIG. 16, the first random number sequence generation section 141 has a pseudo-random number generation section 1411, a first switch 1413, a first serial/parallel conversion section 1414, a second serial/parallel conversion section 1415, and a second switch 1416.

Next, an action of the data communication apparatus according to the present embodiment will be described. In a similar manner to the second embodiment, the pseudo-random number generation section 1411 generates a binary pseudo-random number series 31 in accordance with the first key information 11. The first switch 1413 switches, based on a rate selection signal 36 to be inputted, an output destination of the pseudo-random number series 31 between the first serial/parallel conversion section 1414 and the second serial/parallel conversion section 1415. The first serial/parallel conversion section 1414 performs serial/parallel conversion of the pseudo-random number series 31, and outputs first to eighth modulation pseudo-random number sequences 34a to 34h. The number of the modulation pseudo-random number sequences outputted from the first serial/parallel conversion section 1414 is the same as the number of the input bits to the first multi-level conversion section 142. The second serial/parallel conversion section 1415 performs serial/parallel conversion of the pseudo-random number series 31 and outputs a first to a fourth modulation pseudo-random number sequences 35a to 35d. The number of the modulation pseudo-random number sequences outputted from the second serial/parallel conversion section 1415 is set to be smaller than the number of the input bits to the first multi-level conversion section 142.

The first to eighth modulation pseudo-random number sequences 34a to 34h outputted from the first serial/parallel conversion section 1414 and the first to fourth modulation pseudo-random number sequences 35a to 35d outputted from the second serial/parallel conversion section 1415 are inputted to the second switch 1416. The second switch 1416 selects, based on the rate selection signal 36, either of the inputs from the first serial/parallel conversion section 1414 or the second serial/parallel conversion section 1415, to be outputted to the first multi-level conversion section 142. Here, to the second serial/parallel conversion section 1415, the first to the fourth modulation pseudo-random number sequences 35a to 35d are inputted, and fixed values are also inputted as remaining bit sequences. The configuration and an action of the second random number sequence generation section 241 are not shown, but are the same as those of the first random number sequence generation section 141.

In the case where the first switch 1413 and the second switch 1416 are switched to the first serial/parallel conversion section 1414 side, the data communication apparatus according to the present embodiment performs the same action as that according to the second embodiment. A bit rate of such case is ⅛ of the random number generation rate in the pseudo-random number generation section 1411. On the other hand, the first switch 1413 and the second switch 1416 are switched to the second serial/parallel conversion section 1415 side, the data communication apparatus according to the present embodiment performs the same action as that according to the third embodiment. The bit rate of such case is ¼ of the random number generation rate in the pseudo-random number generation section 1411. In this manner, a plurality of serial/parallel conversion sections, which respectively output different numbers of modulation pseudo-random number sequences, is prepared and used by switching therebetween, whereby it is possible to correspond to different bit rates in spite of being a single pseudo-random number generation rate. That is, since a product of the number of the modulation pseudo-random number sequence and the bit rate is equal to the pseudo-random number generation rate, and thus it is possible to vary the bit rate by switching the number of the modulation pseudo-random number sequences, which is limited to a case where remaining configuration blocks which are not shown in FIG. 16 can be adapted to any transmittable bit rates.

An exemplary configuration of FIG. 16 is merely an example, and any configuration may be possible if the bit rate can be switched by switching the number of the modulation pseudo-random number sequences while the pseudo-random number generation rate is kept constant. Further, the value of the bit rate to be switched is not limited to two, and can be set arbitrarily as necessary.

As above described, according to the present embodiment, it is possible to respond to a plurality of bit rates while the random number generation rate of the pseudo-random number generation section is kept constant.

Note that each of the data communication apparatuses according to the first to the fifth embodiments may have a configuration which combines features of the remaining embodiments. Further, processing performed by each of the data transmitting apparatuses, the data receiving apparatuses, and the data communication apparatuses according to the above-described first to fifth embodiments may be respectively regarded as a data transmitting method, a data receiving method, and a data communication method, each of which cause a series of processing procedure to be executed.

Further, the above-described data transmitting method, the data receiving method, and the data communication method may be realized by causing a CPU to interpret and execute predetermined program data which is capable of executing the above-described processing procedure stored in a storage device (such as a ROM, a RAM, and a hard disk). In such case, the program data may be executed after being stored in the storage device via a storage medium, or may be executed directly from the storage medium. Note that the storage medium includes a ROM, a RAM, a semiconductor memory such as a flash memory, a magnetic disk memory such as a flexible disk and a hard disk, an optical disk such as a CD-ROM, a DVD, and a BD, a memory card, or the like. Further, the storage medium is a notion including a communication medium such as a telephone line and a carrier line.

The data communication apparatus according to the present invention is useful as a safe secret communication apparatus which is unsusceptible to eavesdropping/interception.

While the invention has been described in detail, the foregoing description is in all aspects illustrative and not restrictive. It is understood that numerous other modifications and variations can be devised without departing from the scope of the invention.

What is claimed is:

1. A data transmitting apparatus for encrypting information data by using predetermined key information and for performing secret communication with a receiving apparatus, the data transmitting apparatus comprising:

a multi-level code generation section for generating, based on the predetermined key information, a multi-level code sequence in which a signal level changes so as to approximately represent random numbers;

a multi-level processing section for combining the multi-level code sequence and the information data, and generating a multi-level signal having a plurality of levels corresponding to the combination of the multi-level code sequence and the information data; and a modulator section for performing predetermined modulation processing on the multi-level signal, and outputting a modulated signal, wherein the multi-level code generation section includes:

a random number sequence generation section for generating, based on the predetermined key information, a plurality of modulation pseudo-random number sequences; and a multi-level conversion, into which a plurality of bit sequences including at least part of the plurality of modulation pseudo-random number sequences is inputted as an input bit sequence, for converting the input bit sequence into the multi-level code sequence, wherein the input bit sequence inputted into the multi-level conversion section is greater in a number of digits than each of the plurality of modulation pseudo-random number sequences generated by the random number sequence generation section, and wherein the multi-level processing section allocates different values of the information data to adjoining multi-levels of the multi-level signal.

2. The data transmitting apparatus according to claim 1, wherein at least one of the plurality of modulation pseudo-random number sequences is inputted to the multi-level conversion section as a lowest-order bit of the input bit sequence.

3. The data transmitting apparatus according to claim 1, wherein the multi-level code generation section further includes a physical random number generation section for generating one or more physical random number sequences, and
wherein the one or more physical random number sequences are inputted, into the multi-level conversion section, as remaining bit sequences of the input bit sequence after excluding the at least part of the plurality of modulation pseudo-random number sequences.

4. The data transmitting apparatus according to claim 1, wherein fixed values are inputted, into the multi-level conversion section, as remaining bit sequences of the input bit sequence after excluding the at least part of the plurality of modulation pseudo-random number sequences.

5. The data transmitting apparatus according to claim 1, wherein the multi-level code generation section further includes a physical random number generation section for generating one or more physical random number sequences, and
wherein the one or more physical random number sequences are inputted, into the multi-level conversion section, as a part of the plurality of bit sequences of the input bit sequence after excluding the at least part of the plurality of modulation pseudo-random number sequences, and
wherein fixed values are inputted, into the multi-level conversion section, as remaining bit sequences of the input bit sequence.

6. The data transmitting apparatus according to claim 1, wherein a signal generated based on a predetermined rule is inputted, into the multi-level conversion section, as remaining bit sequences of the input bit sequence after excluding the at least part of the plurality of modulation pseudo-random number sequences.

7. The data transmitting apparatus according to claim 6, wherein the signal generated based on the predetermined rule is generated by delaying a part or a whole of the plurality of modulation pseudo-random number sequences by a predetermined time period.

8. The data transmitting apparatus according to claim 3, wherein a ratio of an information amplitude, which corresponds to an amplitude of the information data, to a fluctuation width of the multi-level signal is greater than a signal-to-noise ratio that is acceptable to a legitimate receiving party.

9. The data transmitting apparatus according to claim 1, wherein the random number sequence generation section includes:
a pseudo-random number generation section for generating, based on the predetermined key information, a pseudo-random number series which is in a binary format; and
a serial/parallel conversion section for performing serial/parallel conversion of the pseudo-random number series generated by the pseudo-random number generation section, and outputting the plurality of modulation pseudo-random number sequences.

10. The data transmitting apparatus according to claim 1, wherein the random number sequence generation section includes:
a pseudo-random number generation section for generating, based on the predetermined key information, a pseudo-random number series which is in a binary format;
a plurality of serial/parallel conversion sections for performing serial/parallel conversion of the pseudo-random number series generated by the pseudo-random number generation section and outputting the plurality of modulation pseudo-random number sequences;
a first switch for switching, based on a rate selection signal, an output destination of the pseudo-random number series generated by the pseudo-random number generation section, between the plurality of serial/parallel conversion sections; and
a second switch for selecting, based on the rate selection signal, and outputting the plurality of modulation pseudo-random number sequences outputted from the plurality of serial/parallel conversion sections, and
wherein the plurality of serial/parallel conversion sections output respectively different numbers of the plurality of modulation pseudo-random number sequences.

11. A data receiving apparatus for receiving information data encrypted by using predetermined key information and for performing secret communication with a transmitting apparatus, the data receiving apparatus comprising:
a multi-level code generation section for generating, based on the predetermined key information, a multi-level code sequence in which a signal level changes so as to approximately represent random numbers;
a demodulator section for demodulating, in a predetermined demodulation method, a modulated signal received from the transmitting apparatus, and outputting, as a result of the demodulating, a multi-level signal having a plurality of levels corresponding to a combination of the information data and the multi-level code sequence; and
a decision section for deciding, based on the multi-level code sequence, different values of the information data that are allocated to adjoining multi-levels of from the multi-level signal,
wherein the multi-level code generation section includes:
a random number sequence generation section for generating, based on the predetermined key information, a plurality of demodulation pseudo-random number sequences; and
a multi-level conversion section, into which a plurality of bit sequences including at least part of the plurality of demodulation pseudo-random number sequences is inputted as an input bit sequence, for converting and which converts the input bit sequence into the multi-level code sequence, and
wherein the input bit sequence inputted into the multi-level conversion section is greater in a number of digits than each of the plurality of demodulation pseudo-random number sequences generated by the random number sequence generation section.

12. The data receiving apparatus according to claim 11, wherein fixed values are inputted, into the multi-level conversion section, as remaining bit sequences of the input bit sequence after excluding the at least part of the plurality of demodulation pseudo-random number sequences.

13. The data receiving apparatus according to claim 11, wherein a signal generated based on a predetermined rule is inputted, into the multi-level conversion section, as remaining bit sequences of the input bit sequence after excluding the at least part of the plurality of demodulation pseudo-random number sequences.

14. The data receiving apparatus according to claim 11, wherein the signal generated based on the predetermined rule is generated by delaying a part or a whole of the plurality of demodulation pseudo-random number sequences by a predetermined time period.

15. The data receiving apparatus according to claim 11, wherein a ratio of an information amplitude, which corresponds to an amplitude of the information data to a fluctuation width of the multi-level signal, which corresponds to remaining bit sequences, after excluding the plurality of demodulation pseudo-random number sequences, of the input bit sequence, is greater than a signal-to-noise ratio that is acceptable to a legitimate receiving party.

16. The data receiving apparatus according to claim 11, wherein the random number sequence generation section includes:
   a pseudo-random number generation section for generating, based on the predetermined key information, a pseudo-random number series which is in a binary format; and
   a serial/parallel conversion section for performing serial/parallel conversion of the pseudo-random number series generated by the pseudo-random number generation section, and outputting the plurality of demodulation pseudo-random number sequences.

17. The data receiving according to claim 11, wherein the random number sequence generation section includes:
   a pseudo-random number generation section for generating, based on the predetermined key information, a pseudo-random number series which is in a binary format;
   a plurality of serial/parallel conversion sections for performing serial/parallel conversion of the pseudo-random number series generated by the pseudo-random number generation section and outputting the plurality of demodulation pseudo-random number sequences;
   a first switch for switching, based on a rate selection signal, an output destination of the pseudo-random number series generated by the pseudo-random number generation section, between the plurality of the serial/parallel conversion sections; and
   a second switch for selecting, based on the rate selection signal, and outputting the plurality of demodulation pseudo-random number sequences series outputted from the plurality of serial/parallel conversion sections, and
   wherein the plurality of serial/parallel conversion sections outputs respectively different numbers of the plurality of demodulation pseudo-random number sequences.

18. A data transmitting method for encrypting information data by using predetermined key information and for performing secret communication with a receiving apparatus, the data transmitting method comprising:
   a multi-level code generation step of generating, based on the predetermined key information, a multi-level code sequence in which a signal level changes so as to approximately represent random numbers;
   a multi-level processing step of combining the multi-level code sequence and the information data, and generating a multi-level signal having a plurality of levels corresponding to the combination of the multi-level code sequence and the information data; and
   a modulation step of performing predetermined modulation processing on the multi-level signal, and outputting a modulated signal,
   wherein the multi-level code generation step includes:
   a random number sequence generation step of generating, based on the predetermined key information, a plurality of modulation pseudo-random number sequences; and
   a multi-level conversion step of inputting, as an input bit sequence, a plurality of bit sequences including at least part of the plurality of modulation pseudo-random number sequences, and converting the input bit sequence into the multi-level code sequence,
   wherein the input bit sequence is greater in a number of digits than each of the plurality of modulation pseudo-random number sequences, and
   wherein the multi-level processing step allocates different values of the information data to adjoining multi-levels of the multi-level signal.

19. A data receiving method for receiving information data encrypted by using predetermined key information and for performing secret communication with a transmitting apparatus, the data receiving method comprising:
   a multi-level code generation step of generating, based on the predetermined key information, a multi-level code sequence in which a signal level changes so as to approximately represent random numbers;
   a demodulation step of demodulating, in a predetermined demodulation method, a modulated signal received from the transmitting apparatus, and outputting, as a result of the demodulating, a multi-level signal having a plurality of levels corresponding to a combination of the information data and the multi-level code sequence; and
   a decision step of deciding, based on the multi-level code sequence, different values of the information data that are allocated to adjoining multi-levels of from the multi-level signal,
   wherein the multi-level code generation step includes:
   a random number sequence generation step of generating, based on the predetermined key information, a plurality of demodulation pseudo-random number sequences; and
   a multi-level conversion step of inputting, as an input bit sequence, a plurality of bit sequences including at least part of the plurality of demodulation pseudo-random number sequences, and converting the input bit sequence into the multi-level code sequence, and
   wherein the input bit sequence is greater in a number of digits than each of the plurality of demodulation pseudo-random number sequences.

* * * * *